US008325030B2

(12) United States Patent
Townsend et al.

(10) Patent No.: US 8,325,030 B2
(45) Date of Patent: Dec. 4, 2012

(54) HEAT STRESS, PLANT STRESS AND PLANT HEALTH MONITOR SYSTEM

(75) Inventors: Christopher P. Townsend, Shelburne, VT (US); Steven W. Arms, Williston, VT (US); David L. Churchill, Burlington, VT (US); Jacob H. Galbreath, Burlington, VT (US)

(73) Assignee: Lord Corporation, Cary, NC (US)

( * ) Notice: Subject to any disclaimer, the term of this patent is extended or adjusted under 35 U.S.C. 154(b) by 1488 days.

(21) Appl. No.: 11/899,840

(22) Filed: Sep. 7, 2007

(65) Prior Publication Data

US 2008/0074254 A1   Mar. 27, 2008

Related U.S. Application Data

(60) Provisional application No. 60/842,979, filed on Sep. 7, 2006, provisional application No. 60/849,212, filed on Oct. 4, 2006.

(51) Int. Cl.
G08B 1/08   (2006.01)
(52) U.S. Cl. .................. 340/539.11; 340/601; 340/521; 340/539.26; 340/693.5; 340/572.1
(58) Field of Classification Search .................. 340/540, 340/573.1, 573.3, 601, 521, 539.26, 693.5, 340/572.1, 539.11, 539.1, 539.3; 600/301; 119/496
See application file for complete search history.

(56) References Cited

U.S. PATENT DOCUMENTS

| | | | |
|---|---|---|---|
| 6,111,501 A | 8/2000 | Honeyager | |
| 6,529,127 B2 | 3/2003 | Townsend et al. | |
| 7,081,693 B2 | 7/2006 | Hamel | |
| 7,135,976 B2 * | 11/2006 | Neff et al. | 340/572.1 |
| 7,256,505 B2 | 8/2007 | Arms | |
| 7,295,108 B2 * | 11/2007 | Corrado et al. | 340/539.22 |
| 7,478,108 B2 | 1/2009 | Townsend | |
| 7,591,187 B2 | 9/2009 | Hamel | |
| 7,639,135 B2 | 12/2009 | Arms | |
| 7,796,038 B2 * | 9/2010 | Batra | 340/572.1 |
| 2002/0009119 A1 | 1/2002 | Matthew | |
| 2003/0234730 A1 | 12/2003 | Arms | |
| 2005/0241593 A1 * | 11/2005 | Kaura | 119/496 |
| 2006/0254365 A1 | 11/2006 | Hamel | |
| 2007/0073482 A1 | 3/2007 | Churchill | |
| 2007/0144396 A1 | 6/2007 | Hamel | |
| 2008/0036617 A1 | 2/2008 | Arms | |
| 2009/0007687 A1 | 1/2009 | Arms | |
| 2009/0112523 A1 | 4/2009 | Townsend | |

OTHER PUBLICATIONS

Kent B. Pandolf, "Prediction modeling of physiological responses and human performance in the heat," 1996.

(Continued)

*Primary Examiner* — Anh V La
(74) *Attorney, Agent, or Firm* — Richard G. Miller

(57) ABSTRACT

One embodiment of an electronic system includes a network having a first sensing device with a first address and a second sensing device with a second address. The first sensing device includes first sensors, a first processor, a first memory, and a first communications device. The first sensors include a first dry bulb temperature sensor, a first relative humidity sensor, and a first radiant energy sensor. The second sensing device includes a second sensor, a second processor, a second memory, and a second communications device. The second processor includes a program to use the second communications device to communicate the second address and data derived from the second sensor to the first communications device.

50 Claims, 17 Drawing Sheets

OTHER PUBLICATIONS

Daniel S. Moran, Avraham Shitzer, Kent B. Pandolf, "A physiological strain index to evaluate heat stress," Am J. Physiol. 275 (Regulatory Integrative Comp. Physiol. 44): R129-R134, 1998.

David Taubenheim, "Distributed radiolocation hardware core for IEEE 802.15.4," Motorola Labs, Dec. 8, 2005.

Zhang H,R.S. Gates,and D.G. Colliver,Turing machine approach to solve psychrometric attributes. Trans of the ASAE 40(3):823-831, 1997.

Jackson R.D., "Remote sensing of biotic and abiotic plant stress," Ann. Rev. Phytopath.,1986 24: 265-87.

Michler O., "Outdoor radiolinks for 2.4 GHz frequencies : measurements results and experiences within the radio communication network, 'Intermobil Region Dresden'" Adv. Radio Sci. 1, 301-307, 2003.

Pelet, ER, Salt, EJ, and Wells, "Signal distortion caused by tree foliage in a 2.5 GHz channel," Canadian conference on electrical and computer engineering, vol. 3, p. 1449-1452, Canada. May 2-5, 2004.

"Heat Stress Control and Heat Casualty Management," Technical Bulletin Medical 507, Air Force Pamphlet 48-152(I) Headquarters, Department of the Army and Air Force, Mar. 7, 2003.

Gonzalez, R.R., et al, "Heat strain models applicable for protective clothing systems: comparison of core temperature response," J. Appl. Physiol. 83:1017-1032, 1997.

Matthew, William T, et al, USARIEM Heat Strain Model: New Algorithms Incorporating Effect of High Terrestrial Altitude, USARIEM Technical Report TO3-9, U.S. Army Research Institute of Environmental Medicine, Mar. 2003.

OPNAVINST 5100.19D, chapter B2, "Heat Stress," Oct. 5, 2000.

Cates, Michael B., memorandum, "Heat Injury Prevention Program," Department of the Army Memorandum, Apr. 8, 2005.

D.S. Moran, et al, "Evaluation and refinement of the environmental stress index (ESI)for different climatic conditions," European Journal of Physiology, 2002.

"Automated Heat Stress System," Marine Corps Base Camp Lejeune, May 2006.

Duck Gun Park, et al, "Development of Flexible Self Adhesive Patch for Professional Heat stress Monitoring Service," Proceedings of the 2005 IEEE Engineering in Medicine and Biology Annual Conference, Shanghai, China, Sep. 1-4, 2005.

Carsten Mundt, NASA Ames Astrobionics, "Lifeguard—A Wearable Vital Signs Monitoring System," Feb. 25, 2004.

Eric Pelet, "Signal Distortion Caused by Tree Foliage in a 2.5 GHz Channel," Thesis, Department of Electrical Engineering, University of Saskatchewan, Saskatoon, Saskatchewan, Canada, Nov. 2003.

Talley, R.L. et al, "Environmental Health Monitor: Advanced Development of Temperature Sensor Suite," Report No. VER-A20-002, U.S. Army Medical Research and Material Command, Jul. 30, 1995.

Nagarajan Ramalingam, "Non-contact multispectral and thermal sensing techniques for detecting leaf surface wetness," dissertation, Food, Agricultural, and Biological Engineering Graduate Program,Ohio State University, 2005.

OPNAVINST 5100.19D, "Training," Oct. 5, 2000.

* cited by examiner

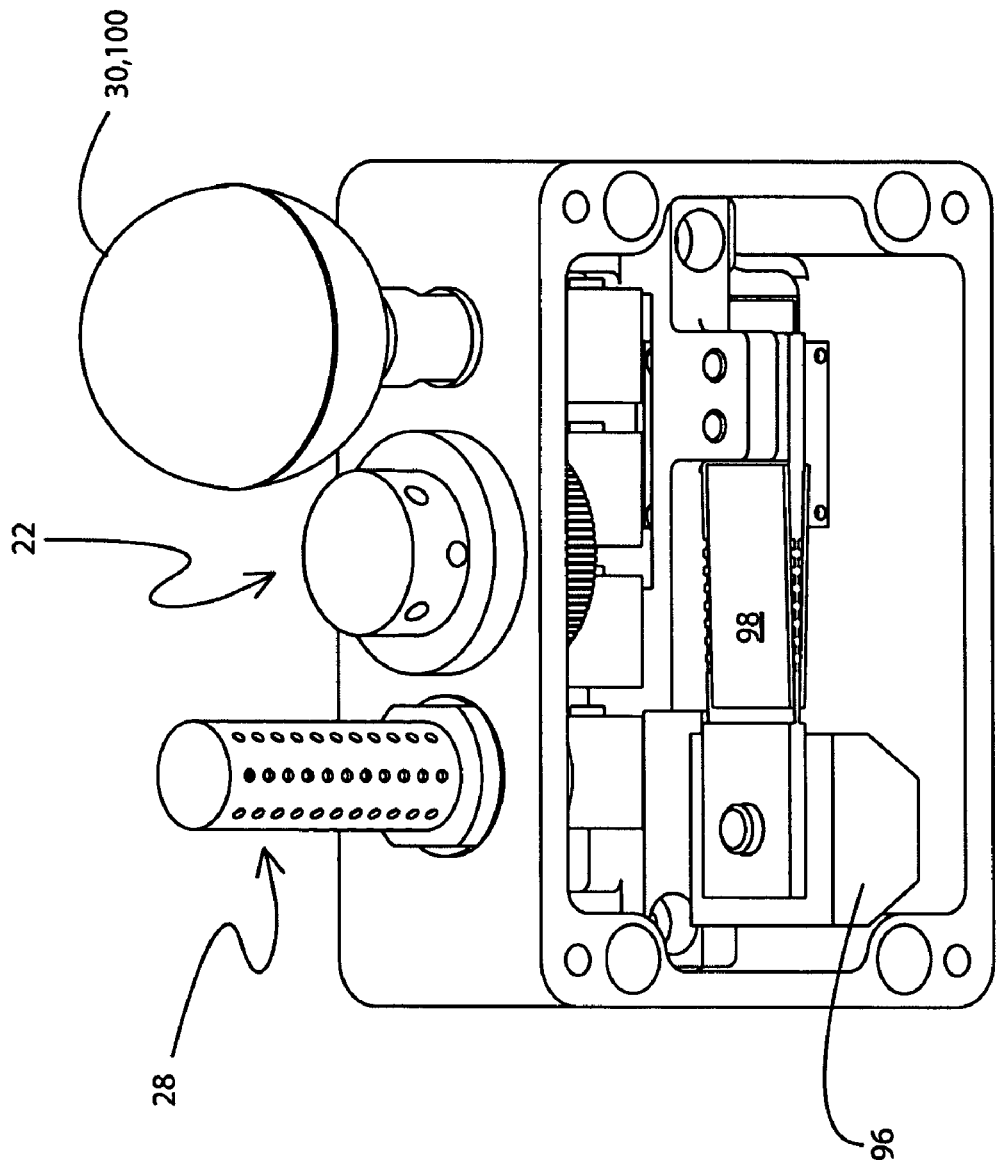

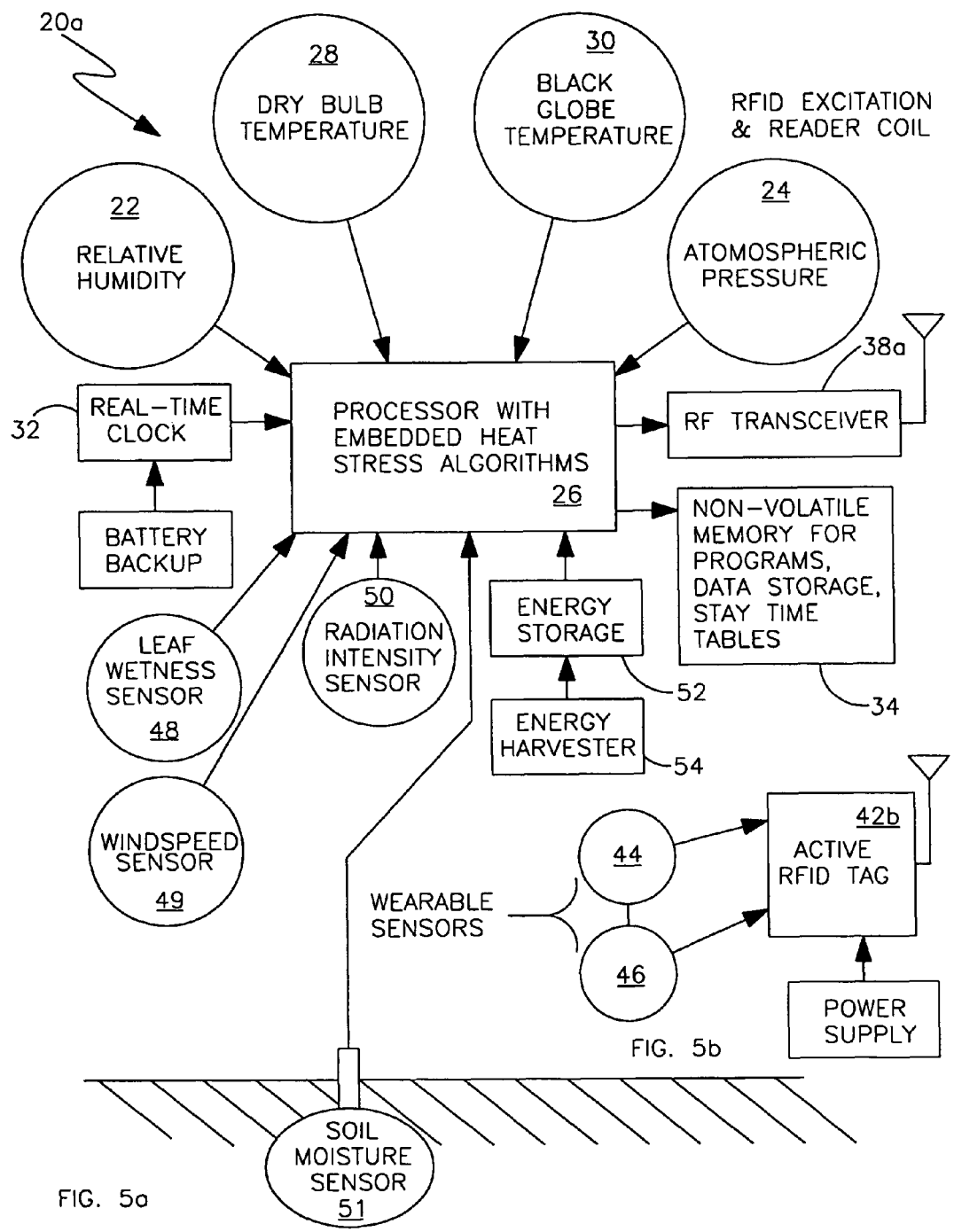

FIG. 6

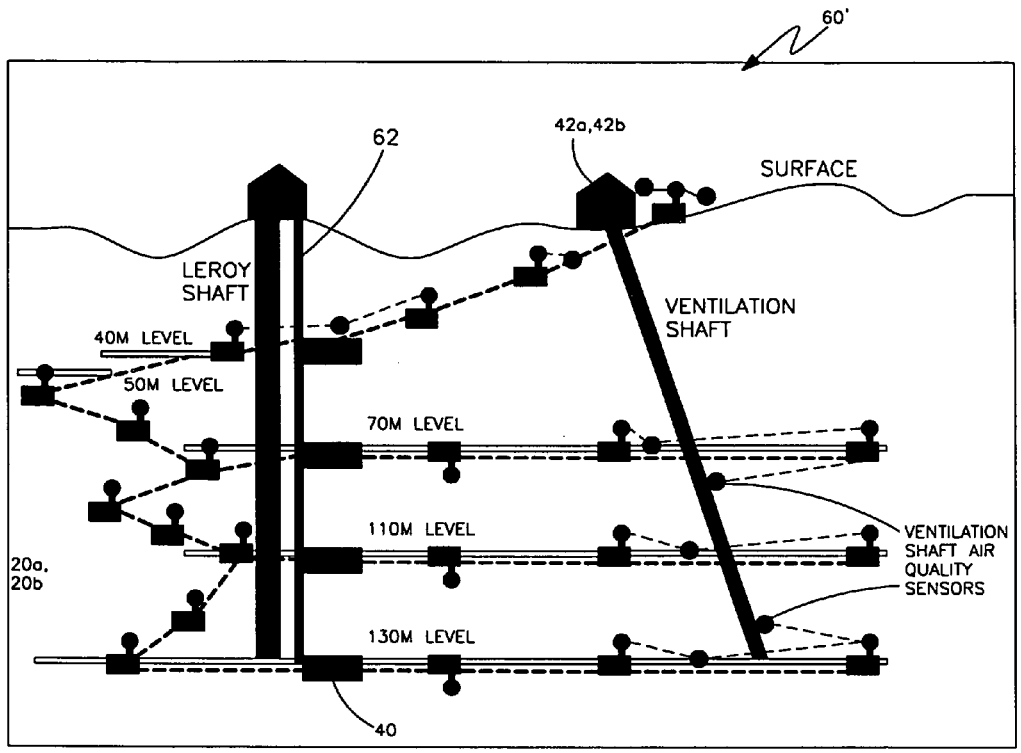

FIG. 8

NOTE: WIRELESS CONNECTIVITY DOES NOT REQUIRE ANTENNA LINE OF SIGHT TO OPERATE

GRAPHIC REPRESENTATION KEY:

■ = HEAT STRESS NODE FULL FUNCTION DEVICE (FFD) CAPABLE OF MESH NETWORKING.

--- = WIRELESS COMMUNICATIONS LINK (RFD TO FFD)

--- = WIRELESS COMMUNICATIONS LINK (FFD TO FFD) AND (FFD TO COORDINATOR)

● = SENSOR (MAY INCLUDE HEAT STRESS) NODE ON MACHINERY, OR WEARABLE RFID TAG, OR WEARABLE DATALOGGING TRANSCEIVER. TYPICALLY PROGRAMMED AS A REDUCED FUNCTION DEVICE (RFD) WHICH TRANSMITS ITS RFID AND SENSOR DATA TO LOCAL FFDs.

■ = COORDINATOR NODE. CONNECTS TO LOCAL AREA NETWORK (LAN) SUCH AS ETHERNET AND/OR WIRELESS LAN

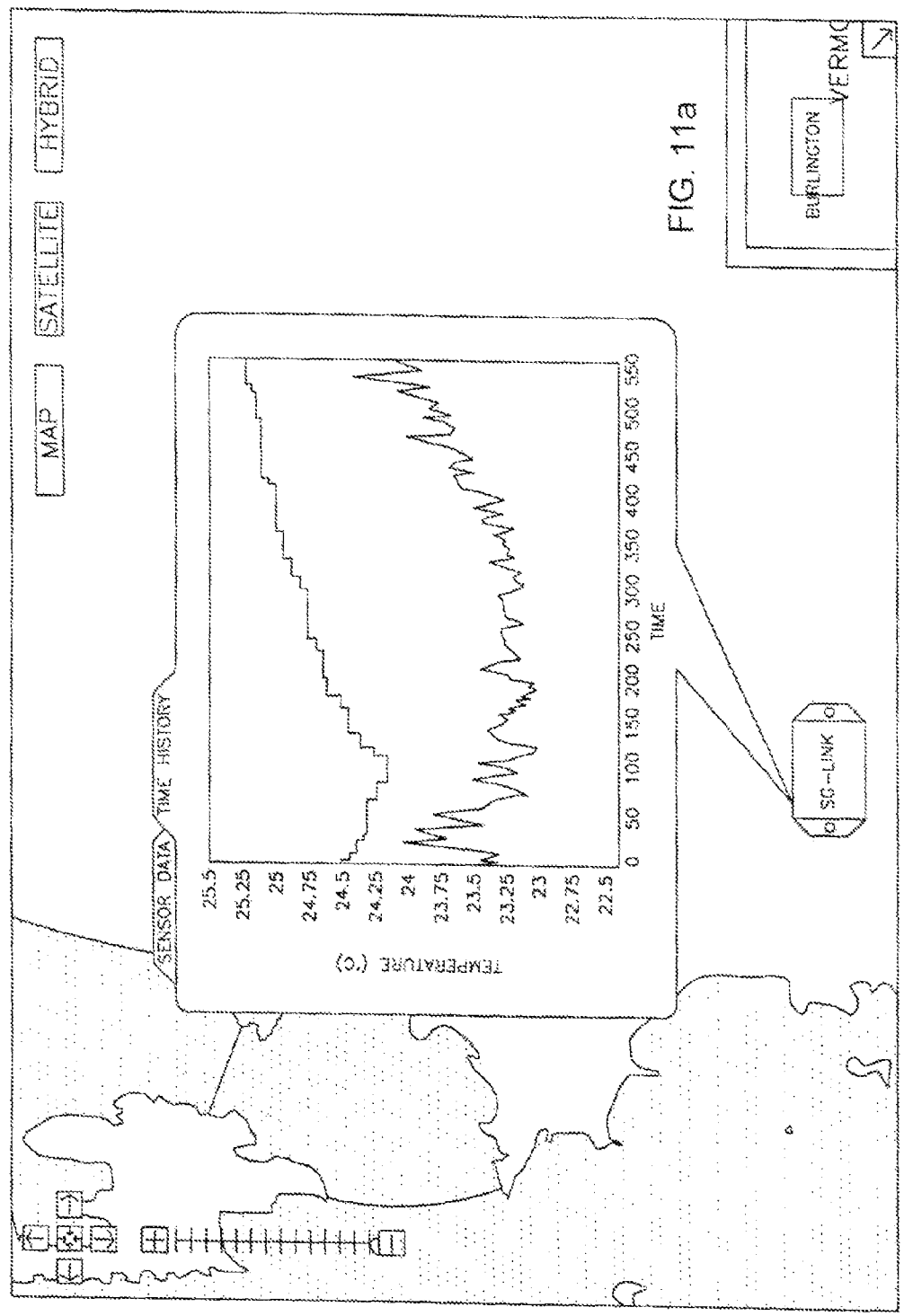

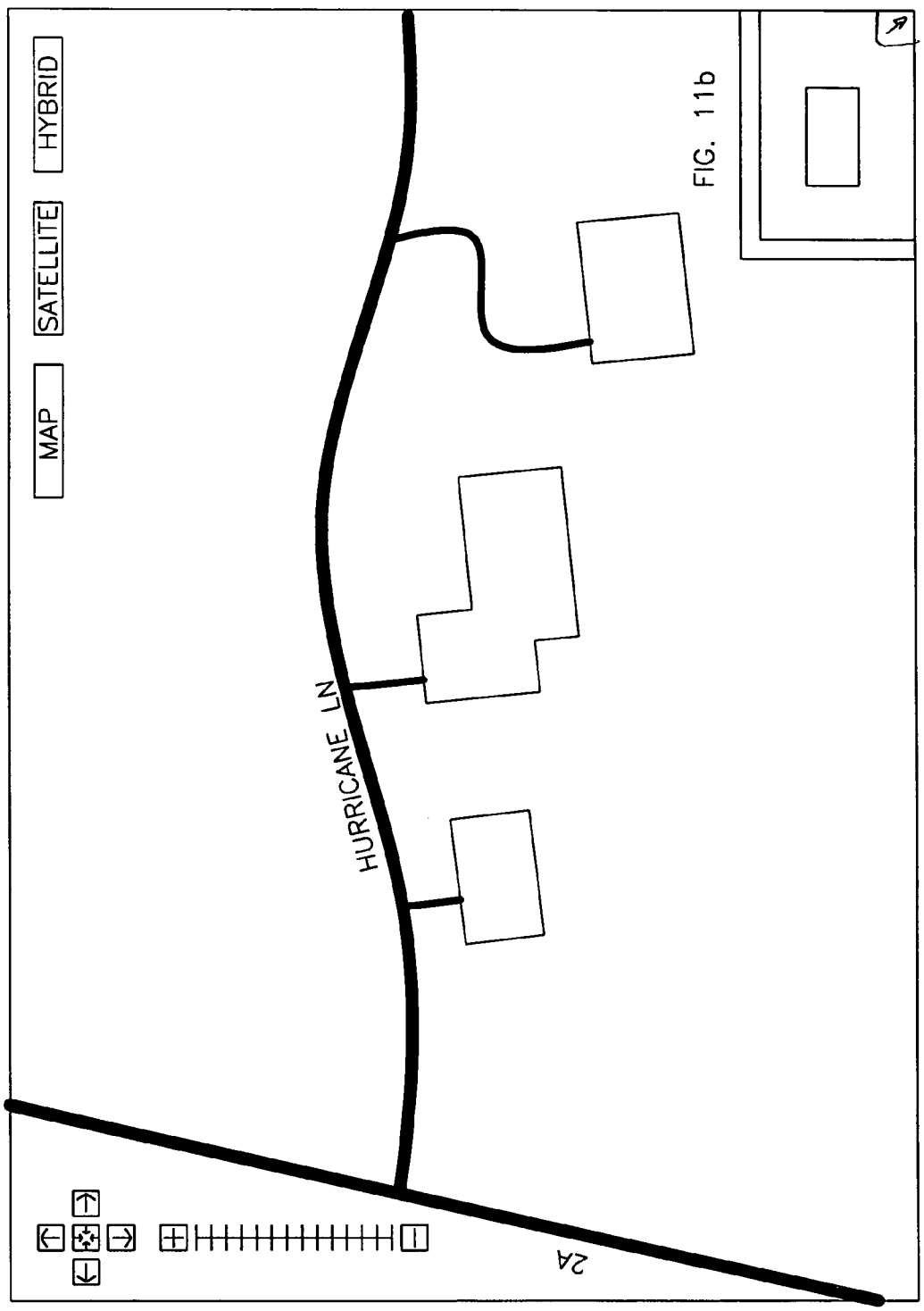

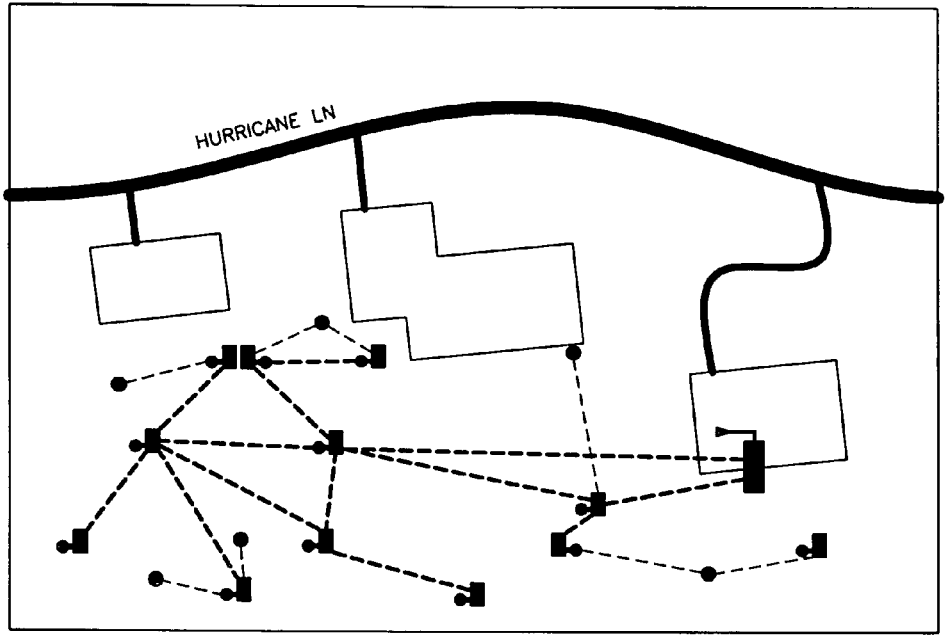

FIG. 11C

NOTE: WIRELESS CONNECTIVITY DOES NOT REQUIRE ANTENNA LINE OF SIGHT TO OPERATE

GRAPHIC REPRESENTATION KEY:

- = HEAT STRESS NODE FULL FUNCTION DEVICE (FFD) CAPABLE OF MESH NETWORKING.

- - - = WIRELESS COMMUNICATIONS LINK (RFD TO FFD)

--- = WIRELESS COMMUNICATIONS LINK (FFD TO FFD) AND (FFD TO COORDINATOR)

● = SENSOR (MAY INCLUDE HEAT STRESS) NODE ON MACHINERY, OR WEARABLE RFID TAG, OR WEARABLE DATALOGGING TRANSCEIVER. TYPICALLY PROGRAMMED AS A REDUCED FUNCTION DEVICE (RFD) WHICH TRANSMITS ITS RFID AND SENSOR DATA TO LOCAL FFDs.

= COORDINATOR NODE. CONNECTS TO LOCAL AREA NETWORK (LAN) SUCH AS ETHERNET AND/OR WIRELESS LAN

HEAT STRESS, PLANT STRESS AND PLANT HEALTH MONITOR SYSTEM

RELATED APPLICATIONS AND PRIORITY

This patent application claims the benefit of provisional patent application No. 60/842,979 entitled "Heat Stress Monitoring System," filed Sep. 7, 2006, incorporated herein by reference.

This patent application also claims the benefit of provisional patent application No. 60/849,212 entitled "Plant Stress and Plant Health Monitor System," filed Oct. 4, 2006, incorporated herein by reference.

This application is also related to the following commonly assigned U.S. patent applications, all of which are incorporated herein by reference:

System for Remote Powering and Communication with a Network of Addressable, Multichannel Sensing Modules, U.S. Pat. No. 6,529,127, issued Mar. 4, 2003.

Data collection and Storage Device, U.S. patent application Ser. No. 09/731,066, filed Dec. 6, 2000.

Energy Harvesting for Wireless Sensor Operation and Data Transmission, U.S. patent application Ser. No. 10/379,223, filed Mar. 5, 2003.

Shaft Mounted Energy Harvesting for Wireless Sensor Operation and Data Transmission, U.S. patent application Ser. No. 10/769,642, filed Jan. 31, 2004.

Strain Gauge with Moisture Barrier and Self-Testing Circuit, U.S. patent application Ser. No. 11/091,244, filed Mar. 28, 2005, Robotic system for powering and interrogating sensors, U.S. patent application Ser. No. 10/379,224, filed Mar. 5, 2003.

Structural damage detection and analysis system, U.S. patent application Ser. No. 11/585,059, filed Oct. 23, 2006.

Wireless Vibrating Strain Gauge for Smart Civil Structures, U.S. patent application Ser. No. 11/431,194, filed May 10, 2006.

High Speed Energy Harvesting Data Acquisition System, U.S. patent application Ser. No. 11/518,777, Sep. 11, 2006.

Sensor Powered Event Logger, U.S. patent application Ser. No. 11/644,038, Dec. 22, 2006.

Method for Integrating an energy harvesting circuit into a PZ element's electrodes, U.S. patent application Ser. No. 11/644,334, Dec. 22, 2006.

Miniaturized wireless inertial sensing system, U.S. patent application Ser. No. 11/446,637, Jun. 5, 2006, Identifying substantially related objects in a wireless sensor network, U.S. patent application Ser. No. 11/260,837, Oct. 27, 2005, This invention was made with Government support under contract number N00024-04-C-4116, awarded by the U.S. Department of the Navy. The Government has certain rights in the invention.

FIELD

This patent application generally relates to a system for measuring heat stress, plant stress, and to systems for remote sensing.

BACKGROUND

Heat stress monitors have been used to set protective limits for workers in stressful environments. The monitors have included a dry bulb thermometer to measure ambient temperature, a wet bulb thermometer to include the effect of humidity, and a globe radiant sensor to include the effect of sunlight or other light or infrared emitting hot objects, such as a furnace. These monitors have been used to help determine stay times and warn workers working in hot and humid environments. Description of some of the serious disorders arising from working in hot and humid environments and the heat stress monitors used to evaluate those environments is provided in papers published by the US Army and US Navy, including OPNAVINST 5100.19D, Chapter B2 and Table B2-A-2, Oct. 5, 2000, "Prediction Modeling of Physiological Responses and Human Performance in the Heat," by Kent B. Pandolf, US Army Research Institute of Environmental Medicine, Natick Mass., and "A physiological strain index to evaluate heat stress," by Daniel S. Moran, et al, US Army Research Institute of Environmental Medicine, Natick Mass., ("the Army/Navy references"), incorporated herein by reference.

Heat stress monitors have required periodic attention because water for the wet bulb thermometer needed frequent replenishment and because data needed to be frequently recorded either by a person reading a display or through a hard wired connection to a separate display system. Thus a better scheme for heat sensor monitoring is needed to eliminate these problems, and this scheme is provided by this patent application.

SUMMARY

One aspect of the present patent application is an electronic system comprising a network having a first sensing device with a first address and a second sensing device with a second address. The first sensing device includes first sensors, a first processor, a first memory, and a first communications device. The first sensors include a first dry bulb temperature sensor, a first relative humidity sensor, and a first radiant energy sensor. The second sensing device includes a second sensor, a second processor, a second memory, and a second communications device. The second processor includes a program to use the second communications device to communicate the second address and data derived from the second sensor to the first communications device.

Another aspect of the present patent application is an electronic system comprising a first sensing device and an RFID tag. The first sensing device includes first sensors, a first processor, a first memory, and a first communications device. The first sensors include a first dry bulb temperature sensor, a first relative humidity sensor, and a first radiant energy sensor. The RFID tag includes a processor programmed to communicate its address to the first communications device.

Another aspect of the present patent application is an electronic system comprising a first sensing device including a first energy harvesting device, first sensors, a first processor, a first memory, and a first communications device. The first sensors include a first dry bulb temperature sensor, a first relative humidity sensor, and a first radiant energy sensor. All power for operating the first communications device is derived from the first energy harvesting device.

Another aspect of the present patent application is an electronic system comprising a first sensing device including a first energy harvesting device, first sensors, a first processor, a first memory, and a first communications device. The first sensors include a first dry bulb temperature sensor, a first relative humidity sensor, a first radiant energy sensor, and a source of electrical power. The processor is capable of sleep mode. The processor includes a program to enter the sleep mode after processing a sample of data from the first sensors.

BRIEF DESCRIPTION OF THE DRAWINGS

The foregoing will be apparent from the following detailed description as illustrated in the accompanying drawings, for clarity not drawn to scale, in which:

FIG. 2d is a photograph of the energy harvesting heat stress node of FIG. 2b taken from another angle to better make visible the piezo and the vibration energy harvester;

FIG. 4b is a block diagram of a passive RFID tag that communicates its ID and sensor data to the heat stress node of FIG. 4a;

FIG. 5a is a block diagram of the heat stress node of FIG. 3a that also receives data from additional sensors for leaf wetness, wind speed, radiation intensity, and soil moisture;

FIG. 5b is a block diagram of an active tag that communicates its ID and sensor data to the heat stress node of FIG. 5a using its own RF transceiver;

FIG. 6 is a display portion of a coordinator node that receives and displays data from twelve heat stress nodes;

FIG. 8 is a block diagram of a wired and wireless network of heat stress nodes, coordinator nodes, and active tags in a mine;

FIG. 11a is a graph with data from two different temperature sensors as a function of time overlaid on a Google Earth map image that shows the location of a plant sensor node with the temperature sensors in northern Vermont;

FIG. 11b is a blow up of the Google Earth map of FIG. 11a showing the location of the plant sensor node; and FIG. 11c is a further blow up of the Google Earth map of FIG. 11b showing the location of a network of plant sensor nodes, coordinator nodes and RFID tags in wireless communication with each other;

DETAILED DESCRIPTION

Figure 1A:
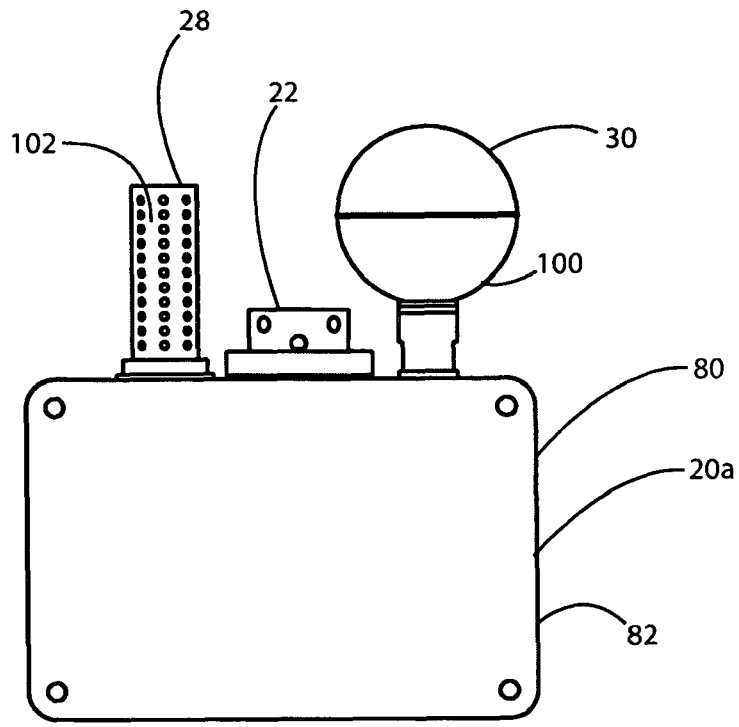
FIG. 1a is a photograph of a heat stress node in its enclosure.

The present patent application provides a wireless data logging heat stress monitor that collects data, stores data, and transmits data automatically and that needs no other servicing, for example, for replenishing water for a wet bulb thermometer or for data collection. Because servicing for water replenishment and data collection is eliminated a large number of the monitors can be deployed without adding manpower for servicing.

In one embodiment, a network of distributed devices can be used to track heat stress in a large number of locations at once. The system can use standard stay time tables to determine the time a particular worker can stay in a particular location based on the data measured by the heat stress monitor in that location. The system can then provide that stay time information to the worker and to the worker's supervisor or provide a warning when the stay time is close to being reached. RFID tags can be provided to people moving among various locations so the system can log time each person spends in each location. Based on the heat stresses accumulated at each location, the stay time table for the stress at each location, and the measured time at each location, the system can accumulate the data to provide such a warning to the worker or to the worker's supervisor.

One embodiment of heat stress node 20a, 20b, that can be part of a system of such nodes, replaces the wet bulb thermometer with solid state relative humidity sensor 22, an atmospheric pressure sensor (not shown) and processor 26, as shown in FIGS. 1a, 1b, 2a, 2b, 3a, 4a, and 5a. This embodiment also includes solid state dry bulb thermometer 28 and black globe radiant sensor 30. Real time clock 32 can be included in the device to provide the data from the sensors as a function of time. In this embodiment sensors 22, 24, 28, 30 provide their data to microprocessor 26 with embedded heat stress algorithms to provide data comparable to a standard stress monitor, as shown in FIGS. 3b, 4b and 5b.

Data from sensors 22, 28, 30 may be logged in memory 34 associated with microprocessor 26 within each node. These data and/or the results of the calculations provided by the microprocessor can then be read locally, for example on a display integrated with the heat stress monitor.

Figure 6:
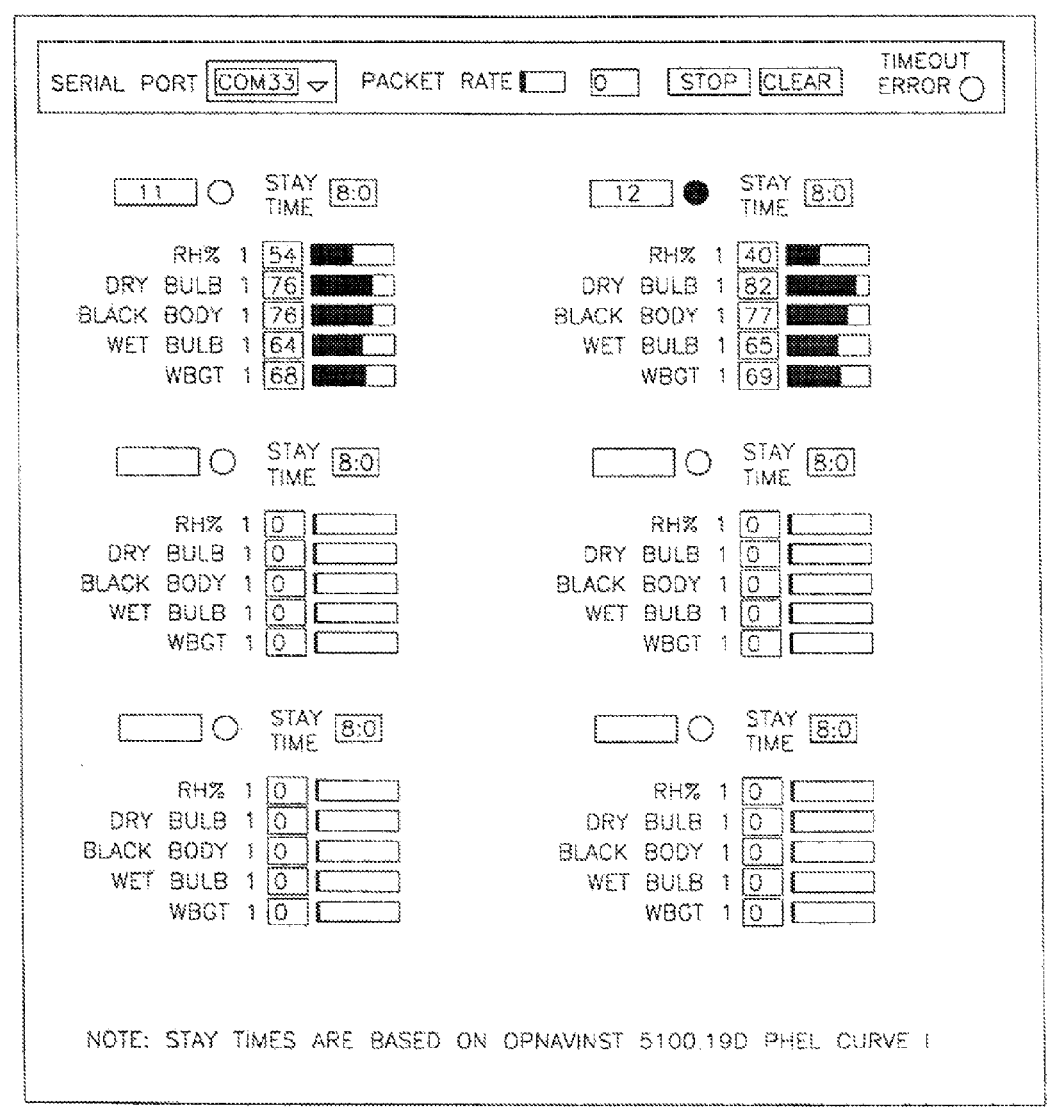
Figure 7:
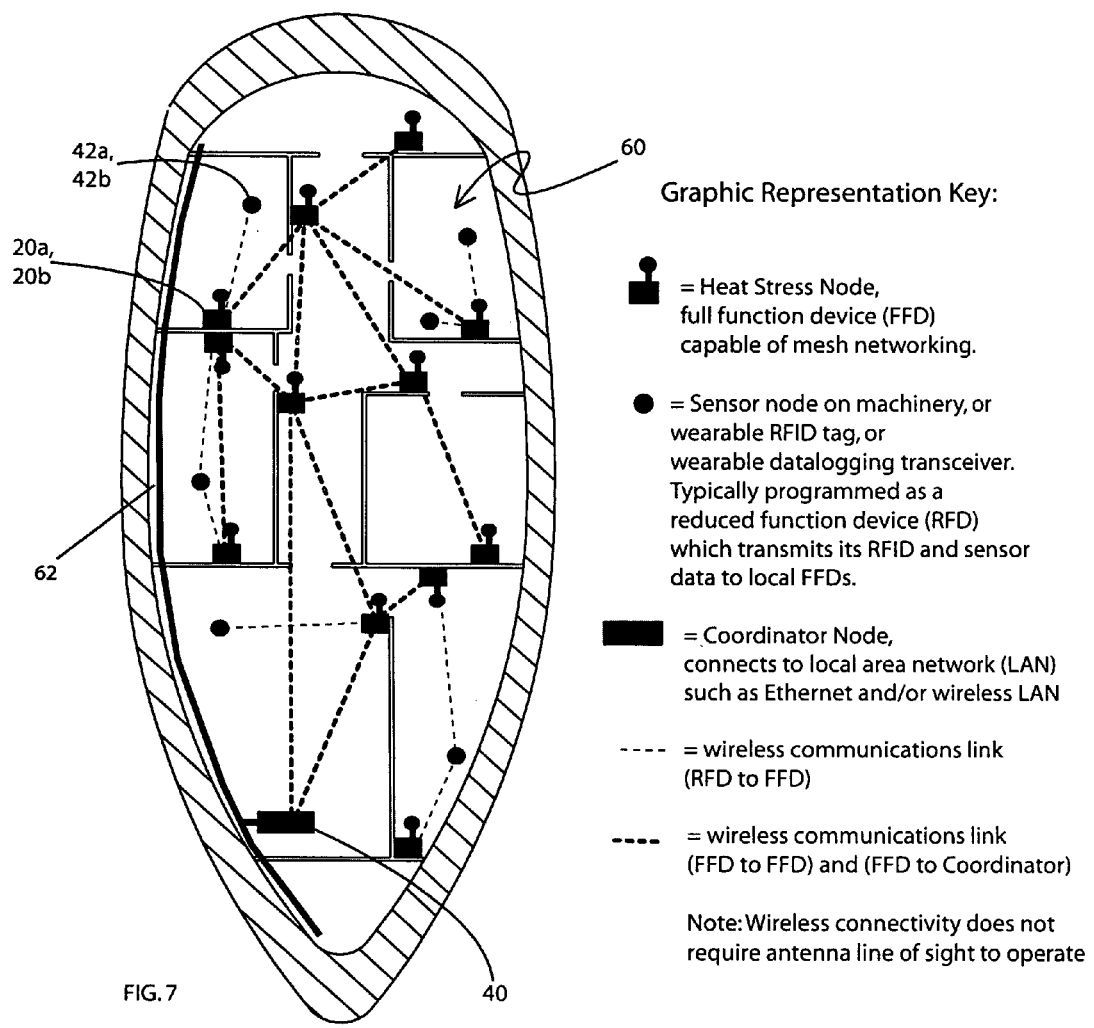
FIG. 7 is a block diagram of a wired and wireless network of heat stress nodes, coordinator nodes, and active tags on a ship.

System display 36, created by the present applicants and shown in FIG. 6, provides for simultaneous numerical and graphical display of five measured or calculated parameters from 12 distinct wireless heat stress monitors. The five parameters displayed are Wet Bulb Globe Temperature (WBGT), wet bulb temperature, black body temperature, dry bulb temperature, and relative humidity. In the specific case shown in FIG. 6, data was transmitted from transceivers 38a in two wireless heat stress nodes using 802.15.4 "Zigbee" protocols over a star or star-mesh wireless network to base station "coordinator" node 40, as shown in FIG. 7, that includes system display 36. These data could also be transmitted over wired analog or digital connections, such as Ethernet, RS-232, RS-485, USB, etc. Alternatively an individual display (not shown) may be integrated into each individual heat stress node 20 to support applications where a local display of node data is advantageous, such as for node testing and measurement.

Figure 3A:
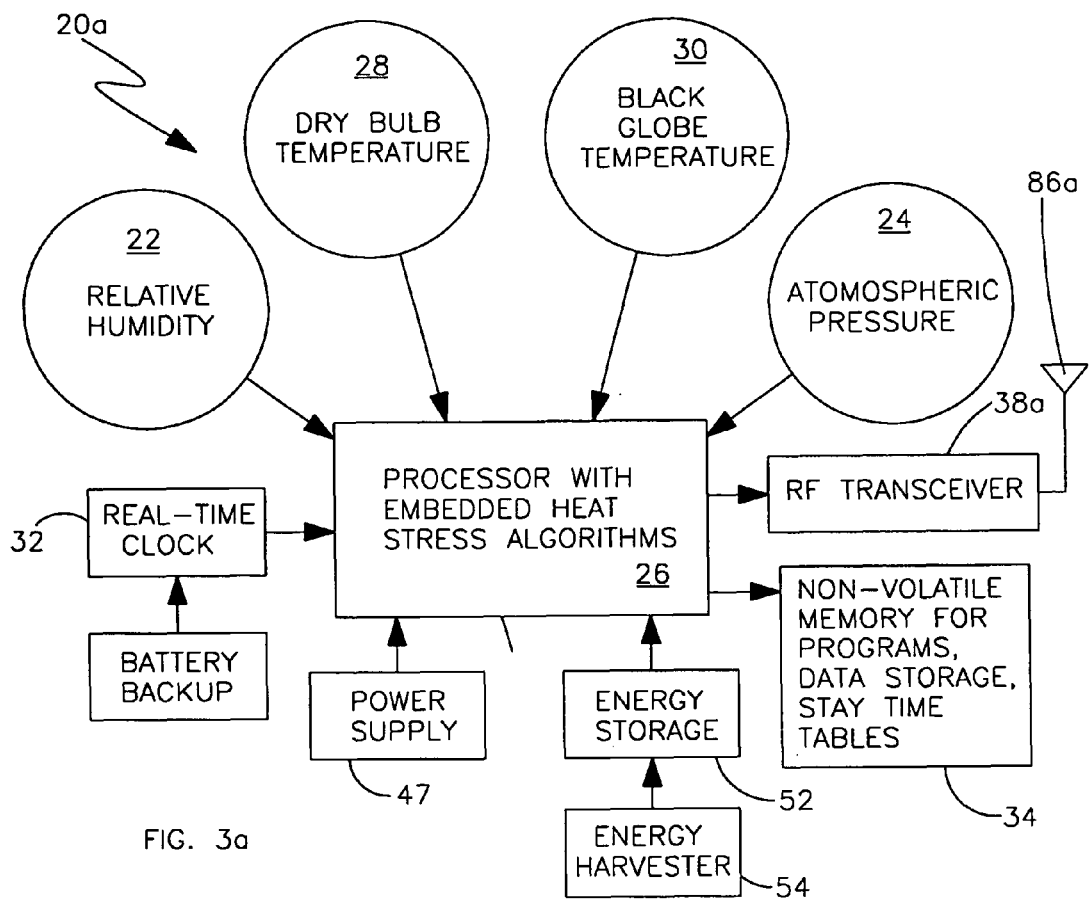
FIG. 3a is a block diagram of the heat stress node of FIGS. 2a-2d with an RF transceiver.
Figure 4A:
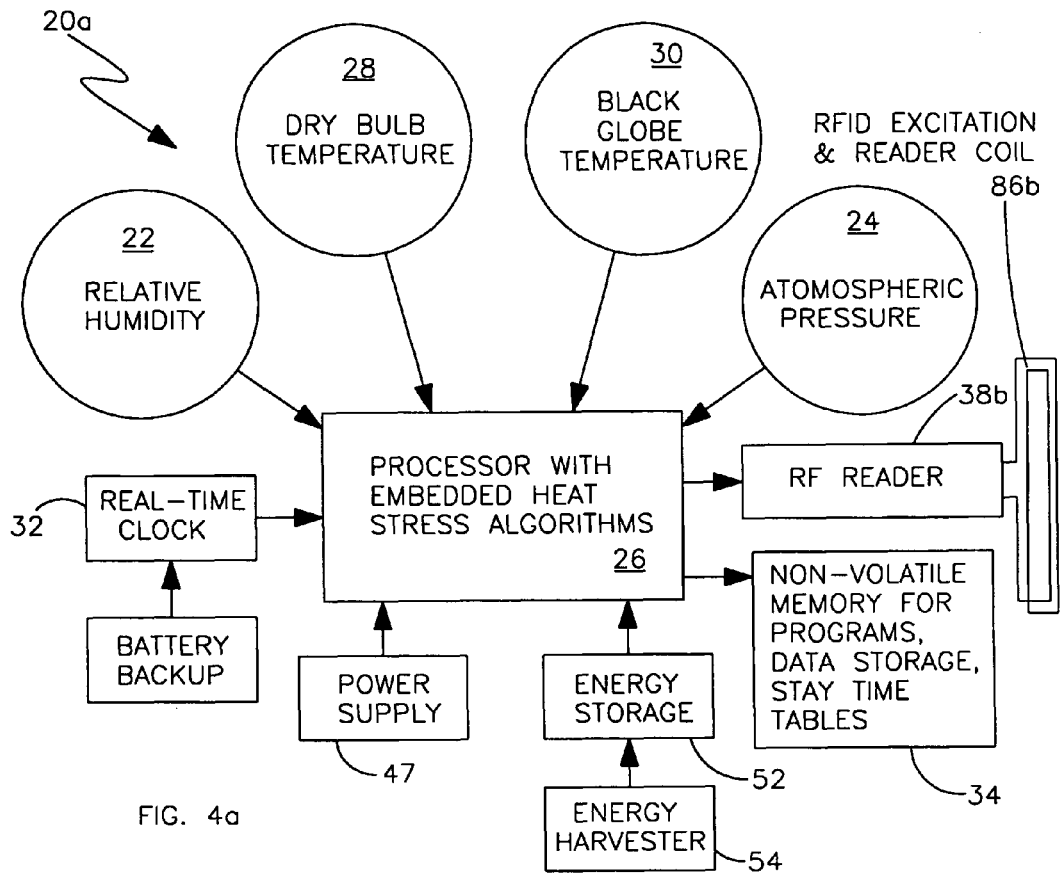
FIG. 4a is a block diagram of the heat stress node of FIGS. 2a-2d with an RFID Exciter/Reader.
Figure 4B:
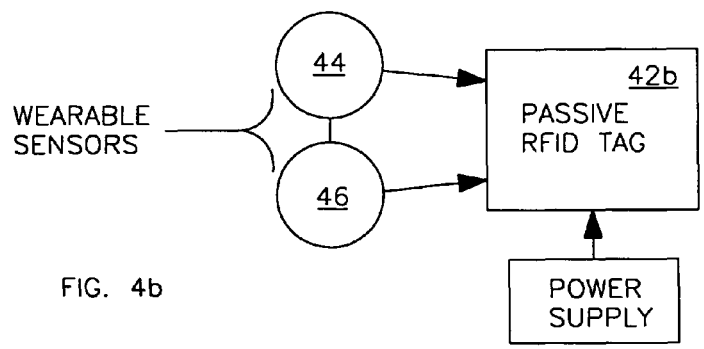

In one embodiment, RF transceiver 38a of FIG. 3a or RFID reader 38b of FIG. 4a is used to communicate with other devices, such as wearable passive or active RFID tags 42a, 42b mounted on subjects that may move around in the vicinity of heat stress node 20a, 20b. The present inventors built wearable RFID tags that transmit their unique ID addresses periodically using IEEE 802.15.4 and "Zigbee" software protocols.

These wearable RFID tags can include one or more sensors 44, 46. The subject wearing the wearable RFID tag can be a person, an animal, a plant, or a mobile machine. Sensors 44, 46 can sense information about the environment around RFID tag 42a, 42b. For example sensors 44, 46 can be personal biomonitoring sensors, such as a body temperature sensor, a heart rate sensor, a respiration sensor, a blood pressure sensor, an electrocardiogram sensor, or an accelerometer. In one embodiment sensors are included that can give indication of the amount of work the wearer is doing while subject to the temperature and humidity conditions. In another application sensors 44, 46 can provide information related to plant health, including leaf wetness 48, wind speed 49, radiation intensity 50, and soil moisture 51. Sensors 44, 46 can also monitor other environmental conditions such as chemicals. They may also monitor parameters related to machine health, such as vibration. They may also monitor location.

RFID tag 42a, 42b may act as a reduced function device or "leaf node," as shown in FIGS. 3b, 4b.

RF transceiver 38a or RFID reader 38b can also communicate data to other members of a network, such as other heat stress nodes 20a, 20b, or to base station coordinator node 40, as shown in FIGS. 7 and 8.

In another embodiment, wearable RFID tag 42a, 42b can provide its ID address code to the closest heat stress node, 20a, 20b which can keep track of the exposure time, stay time and the time remaining for that specific RFID tag. Heat stress node 20a, 20b may include an audible alarm that sounds to alert a nearby wearer of the RFID tag. RFID tag 42a, 42b can have its own vibrator or audible alarm, and heat stress node 20a, 20b can send a signal to RFID tag 42a, 42b to activate this alarm. Heat stress node 20a, 20b can also send a signal to a central office where the manager of the facility can receive summary information on a display. The manager can use this information to alert personnel, adjust conditions and stay times, or otherwise better utilize the human resources.

In another embodiment, wearable RFID tag 42a, 42b can receive heat stress data transmitted from the heat stress nodes and use this data to determine a local stay time and display this time to the wearer. The RFID tag can have a clock, and can keep track of the exposure and the time remaining.

The stay time can be updated to reflect the wearer's task/activity level, type of protective clothing, age, body mass index, acclimation history and/or other parameters that may influence the stay time for that particular individual during exposure to heat stress. These factors are described in the Army/Navy references.

In one embodiment the subject can be a person or an animal wearing RFID tag 42a, 42b that communicates with one or more fixed heat stress nodes 20a, 20b. This system is capable of keeping track of who is exposed to what environments and heat stresses. The data can be sent to a server connected to the internet. It can also be logged locally on RFID tag 42a, 42b that can have a memory for recording data. Data can also be recorded in non-volatile memory 34 in heat stress node 20a, 20b. Many organism's heat stress histories can then be kept track of without each organism being required to wear a heat stress sensing suite.

Heat stress node 20a, 20b can be plugged in to an available source of power, such as a wall outlet 47, as shown in FIGS. 3 and 4. Mobile power supply 52, such as a primary or rechargeable battery, can be used. In still another embodiment energy harvesting system 54 can be used. Energy harvesting systems have been described in commonly assigned U.S. Pat. No. 6,529,127, "System for Remote Powering and Communication with a Network of Addressable, Multichannel Sensing Modules," issued Mar. 4, 2003, incorporated herein by reference. Energy from the energy harvesting system can be stored on a rechargeable battery or on a super capacitor.

Many such heat stress monitoring systems can be deployed, and they can communicate with each other in a wired or wireless network, as shown in FIGS. 7 & 8. Network 60 of heat stress nodes 20a, 20b and sensor nodes, such as wearable RFID tags 42a, 42b, as they may be used within a section of a Navy ship is illustrated in FIG. 7. Network 60' of heat stress nodes 20a, 20b and sensor nodes, such as wearable RFID tags 42a, 42b, as they may be used within an underground mining operation is illustrated in FIG. 8. Some of heat stress nodes 20a, 20b are connected to Ethernet local area network 62. This connection can also be supported using wireless Ethernet protocols, such as 802.11.b ("WiFi").

In the embodiment of FIG. 7, a shipboard system can have one or more heat stress monitoring systems located within each compartment. Each sailor can have a wearable RFID tag that communicates his or her identifying code to a particular heat stress node 20a, 20b when the sailor is in the vicinity of that node. The time that the sailor is in that vicinity can be logged in non-volatile memory 34 of heat stress node 20a, 20b. Coordinator node 40 can receive data from various heat stress nodes 20a, 20b including data from each sailor's previous heat stress exposure in other locations on the ship. The coordinator node 40 can be programmed to do the aggregation. Alternatively a central computer connected to Ethernet LAN 62 can do the aggregation of the data to determine a stay time and a time remaining in any location. Thus, heat stress node 20a, 20b will provide low data rate periodic updates of WBGT data, for example, to the nearest coordinator 40 which in turn will relay these data to a central personal computer host. This allows a supervisor to view and record heat stress data from all the nodes on the network, and to manage an entire facility or operation, such as a ship, submarine, agricultural field, mining operation, greenhouse, etc.

Coordinator node 40 can also be one of the heat stress nodes 20a, 20b. As described herein above, coordinator node 40 can have additional software that allows it to poll the other heat stress node 20a, 20b and accumulate their data. Coordinator node 40 also has ethernet connectivity to be able to supply data to a hardwired LAN. Once a predetermined exposure has been reached coordinator node 40 can send a message to heat stress node 20a, 20b nearest the sailor and to a display available to the supervisor with notice that the sailor should be removed from a heat stress environment.

If the sailor is in the vicinity of two or more heat stress nodes 20a, 20b his or her position with respect to those heat stress nodes can be more accurately determined from received signal strength from his or her RFID tag to each heat stress node 20a, 20b combined with diversity antennas at each heat stress node 20a, 20b, as described in commonly assigned U.S. Patent application No. 60/762,632, incorporated herein by reference.

In addition, each heat stress node 20a, 20b can include transceiver 38a that has built-in radiolocation estimation, such as those available from Chipcon, now Texas Instruments, which incorporates a radiolocation algorithm developed by Motorola. This technique is described in a white paper, entitled "Distributed Radiolocation Hardware Core for IEEE 802.15.4", by David Taubenheim, Spyros Kyperountas, and Neiyer Correal of Motorola Labs, Plantation, Fla., USA, incorporated herein by reference.

Such localization techniques allow for determining the closest heat stress node 20a, 20b to a subject, and for assigning the temperature information of that closest heat stress node to that subject. Such localization techniques also allow locating the subject, which may for example be portable equipment carrying an RFID tag or a heat stress node or a person wearing an RFID tag.

Figure 9:
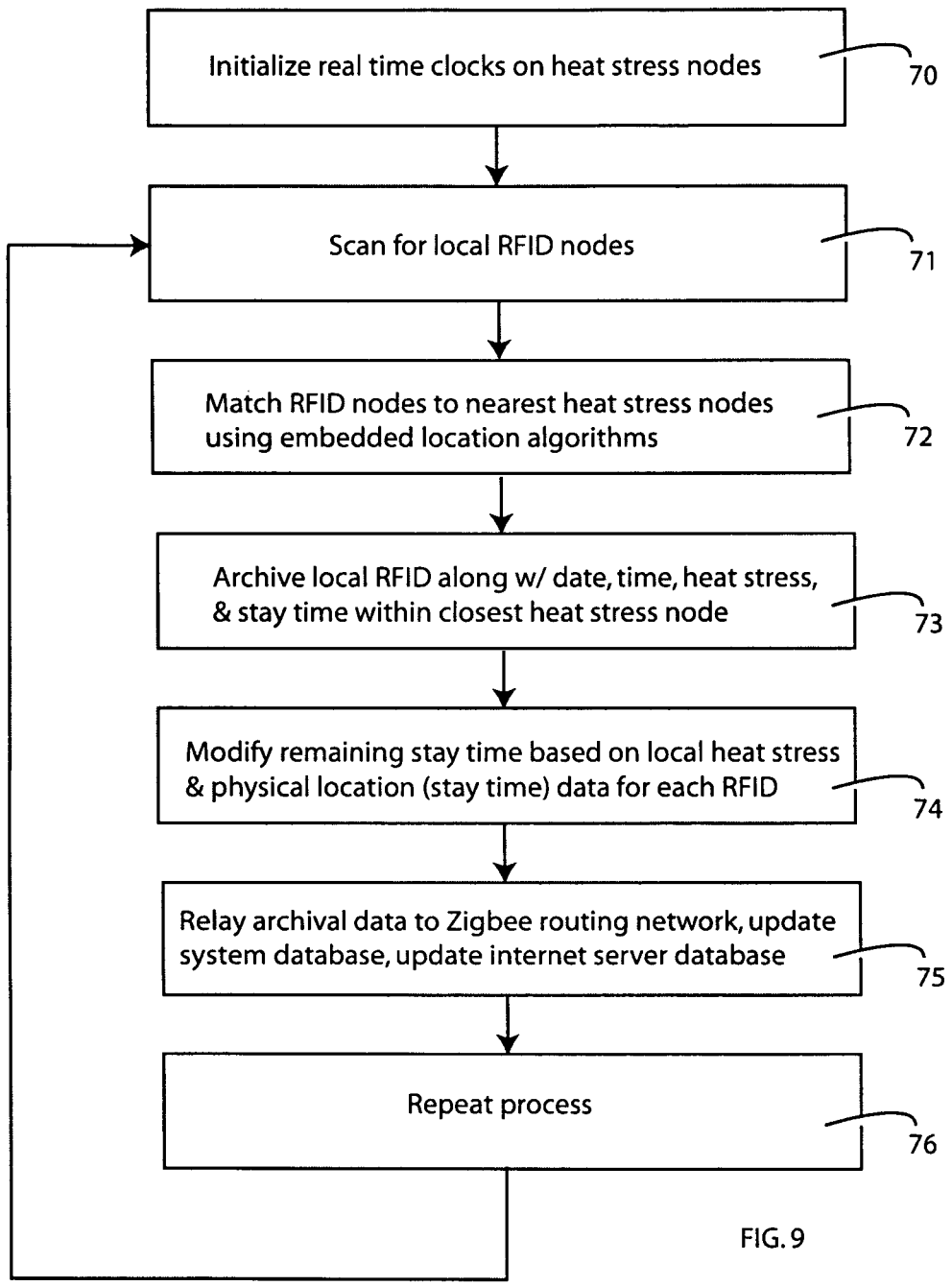
FIG. 9 is a flow chart illustrating the process of continual monitoring and automatic recording of heat stress conditions and stay times from a network of uniquely identified subjects and/or objects.

A flowchart for continual monitoring and automatic recording of heat stress conditions and stay times is provided in FIG. 9. Real time clocks 32 on heat stress nodes 20a, 20b are initialized with a date and time provided from a clock standard that may be propagated over the LAN to the coordinator node which transmits it to each heat stress node 20a, 20b, as shown in box 70.

Each heat stress node 20a, 20b then scans for the presence of local RFID tags 42a, 42b, as shown in box 71.

Embedded location algorithms are used by processors in heat stress nodes 20a, 20b to match RFID tags 42a, 42b to the nearest heat stress nodes 20a, 20b, as shown in box 72.

Identification codes of RFID tags 42a, 42b in the vicinity of each heat stress node 20a, 20b, date, time, heat stress, and stay time data are recorded in non-volatile memory within closest heat stress node 20a, 20b, as shown in box 73.

Processor 26 modifies stay time for each RFID tag 42a, 42b in its vicinity based on heat stress data recorded by heat stress node 20a, 20b, as shown in box 74.

Data stored in heat stress node 20a, 20b is transmitted through a Zigbee routing network to update a system database in coordinator 40, in an internet server database that is programmed to aggregate data from different heat stress nodes, as shown in box 75. The server may also display the data from the different heat stress nodes, as shown in FIG. 6.

The process is repeated, as shown in box 76, to monitor movement of subjects that are wearing RFID tabs 42a, 42b to other locations and to monitor changes in heat stress parameters in each location.

Mechanical Design and Use

Figure 1B:
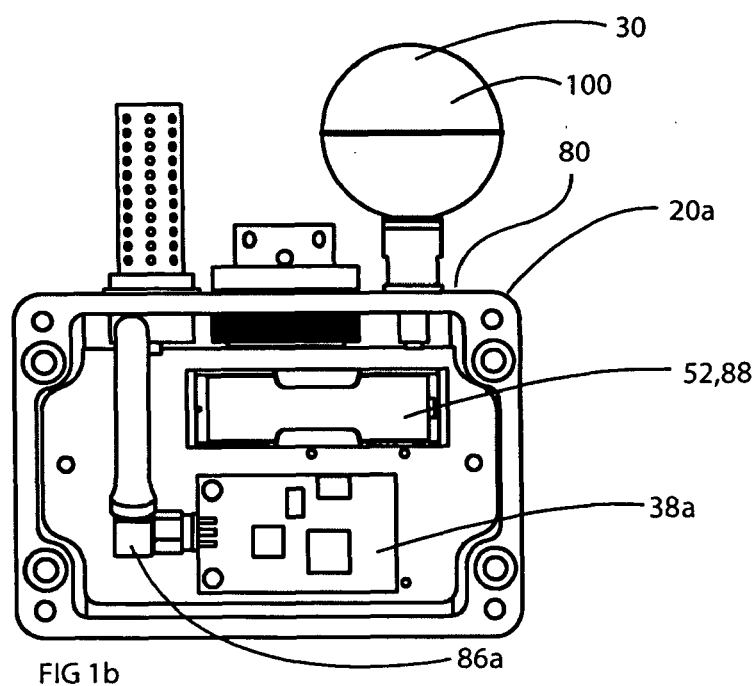
FIG. 1b is a photograph of the heat stress node of FIG. 1a with the cover removed.

As built by applicants, wireless heat stress node 20a, 20b, includes enclosure 80 having cover 82 that encloses processor 26, data logging module 34, wireless transceiver communications module 38a, internal antenna 86a or RFID excitation and reader coil 86b, and other internal signal conditioning components. One version includes a battery 88 serving as mobile power supply 52, as shown in FIG. 1b. Another version may include energy storage batteries serving as mobile power supply 52. Another version includes rechargeable batteries 88 and energy harvester 92, as shown in FIG. 2b. Energy harvester 92 harvests vibration energy and includes slotted tapered cantilever beam 94 with mass 96 mounted toward one end and piezoelectric elements 98 bonded to top and bottom surfaces.

Mounted to enclosure 80 are relative humidity/temperature sensing element (RH) 22, dry bulb temperature sensor (DB) 28, and black body globe temperature sensor (BBG) 30 and atmospheric pressure sensor 24. Other sensors can also be included in or on heat stress node 20a, 20b, such as a pressure sensor and air quality sensors. Other sensors can be separate and can communicate with heat stress node 20a, 20b, as shown in FIGS. 7 and 8.

The parameter Wet Bulb Globe Temperature (WBGT) is commonly used as guidance for environmental heat stress to prevent heat stroke during physical exercise or while at work. WBGT is commonly determined from black globe temperature, air temperature, and wet bulb temperature.

Black globe temperature sensor 30 includes black globe 100 with a temperature sensor located at the center. The black globe temperature (Tg) represents the integrated effects of radiation and air flow.

Air temperature (Tair) sensor 28 includes a temperature sensor shielded from radiation and air currents, and is generally located within stainless steel tube 102 that has apertures, as shown in FIGS. 1a, 1b, 2a, 2b.

The wet-bulb temperature (Twb) is calculated using three inputs, relative humidity (RH), air temperature, and atmospheric pressure. This technique allows for the elimination of the wet bulb temperature sensor from the apparatus of the present patent application. This allows elimination of providing and maintaining distilled water in a wet bulb reservoir. Along with the automatic data reporting this frees up heat stress monitor 20a, 20b from periodic maintenance for refilling the water and reading the data. Since pressure is largely a function of altitude, pressure can often be assumed to be a constant and need not be measured. For example, in the case of application to a Navy surface ship a typical atmospheric pressure may be preprogrammed as such in memory.

An iterative method was used to calculate Twb from the three inputs as described in the paper by Zhang, H., R. S. Gates and D. G. Colliver, "Turing machine approach to solve psychrometric attributes," *Trans of the ASAE* 40(3):823-831. That method was reduced to practice on an embedded microcontroller mounted on the printed circuit board of each heat stress node 20a, 20b.

In one embodiment up to twenty iterations of the loop are performed before a final value is returned. The iterations are limited to twenty cycles so the process ends even if data does not converge to the condition of less than one part in 10,000. Generally, data will converge unless a sensor is broken or gives an invalid reading. An error code was returned if the data does not converge.

These three elements Tg, Twb, and Ta are combined into a weighted average to produce the WBGT:

$$WBGT = 0.7 \times Twb + 0.2 \times Tg + 0.1 \times Ta$$

Stay time was determined in heat stress node 20a, 20b through the use of a look up table that was programmed into non-volatile EEPROM memory 34. The lookup table contained all the PHEL Type I data points listed in OPNAVINST 5100.19D, Table B2-A-2, as provided in the Navy reference, ranging from 80 to 125 degrees F. The stay time value was determined by using the WBGT value, calculated as described herein above, to index into that lookup table.

An available prior art heat stress measurement system, the MicroTherm WBGT unit (produced by Metrosonics), which has a wet bulb thermometer with water reservoir, was used for comparison with the calculated WBGT obtained using data from heat stress nodes 20a, 20b built by the present applicants. Since the MicroTherm WBGT does not compute stay time validation of the heat stress node system of the present application was achieved by manually applying the MicroTherm WBGT temperature to the OPNAVINST PHEL Type I curve to manually calculate a reference stay-time for each temperature/humidity set point during environmental chamber testing. The worst case wet bulb globe temperature WBGT difference between results of the two systems was found to be only 2 degrees F. over the full temperature/humidity test regime, which was from 40° F. to 125° F. for nine heat stress nodes.

Multi-Hop Networking and Encryption

Multi-hop networking was implemented with wireless heat stress nodes using EmberZNet software stack version 2.0 (Ember Corp, Boston, Mass.). Twelve (12) nodes were deployed along with 8 access point (AP) coordinator nodes 40. Heat stress data successfully transferred from each of the nodes to a central AP or coordinator on a full mesh network. 128-bit encryption was implemented and tested using a Chipcon CC2420 radio. An Ember EM2420 radio can also be used.

Wireless Battery Powered and Wireless Energy Harvesting for Health Monitoring Sensors The present applicants built both battery powered and energy harvesting wireless heat stress nodes, as shown in FIGS. 1a, 1b, 2a, 2b. A circuit board that includes both the heat stress application circuit and the energy harvesting circuitry has been designed. The board incorporates an IEEE802.1.4 compatible radio along with contacts for wiring extending from all the sensors required to measure heat stress. The board also includes the energy harvesting power controller electronics. Included are ⅓AAA size Nickel Metal Hydride (NiMh) batteries that are background charged by the electronics when the piezoelectric energy harvesting circuit provides more power then required by the heat stress application.

In one embodiment wireless energy harvesting heat stress nodes (WEHSN) are designed to be reduced function devices (RFD's). They are not designed to support full multihop routing capability, allowing them to consume extremely low power and allowing them to be fully functional even when minimal vibration is present. The reduced power WEHSN's communicate their data back to a base station at a preprogrammed interval and the base station can then communicate to other devices in a mesh network. Thus, the present applicants found that they could use energy harvesting to power data collection, data processing, and communication with their WEHSN by limiting communication of the WEHSN's and implementing a hybrid star-mesh network.

This hybrid between the star network and the mesh network provides for a robust and versatile communications network, while maintaining the ability to keep the wireless sensor nodes power consumption to a minimum. In this network topology, the lowest power sensor nodes, which in this case are the WEHSN's are not enabled with the ability to forward messages; they can just communicate with a local base station. This allows for minimal power consumption for the WEHSN's to be maintained so energy harvesting could be used to provide for that power consumption. However, other nodes on the network are enabled with multihop capability, allowing them to forward messages from the low power nodes to the other nodes on the network. Generally, the nodes with the multihop capability are higher power, and if possible, are often plugged into the electrical mains line. This is the topology implemented by the mesh networking standard known as Zigbee.

Two main boards were used in a heat stress module built by applicants, a heat stress application board and an IEEE802.15.4 direct sequence spread spectrum transmitter board. The heat stress application board has microprocessor 26, which reads the data from the three temperature sensors, dry air temperature sensor 28, black body globe temperature sensor 30, and relative humidity sensor 22, and which calculates the wet bulb temperature and the WGBT index. In one embodiment, once a calculation cycle is complete RF transceiver 38a is powered up and a data packet is transmitted.

The average quiescent supply current (energy consumption) for the energy harvesting heat stress monitoring node (operating as a reduced function "Zigbee" node) was measured to be 14 microamps with a wireless transmission update of WGBT index every 3 minutes. When the update rate was changed to one minute, the average quiescent current was measured to be 19 microamps. If the piezoelectric energy harvester was producing any power above that required of the application, the excess energy was stored by charging a bank of four internal Nickel Metal Hydride (NiMh) batteries. The combined capacity of the NiMh batteries is 200 mA-hrs, which will allow for over one year of operation without any vibration applied to the unit. So a charged system will operate for a long period of time even in conditions of zero ambient vibrational energy.

Figure 2A:
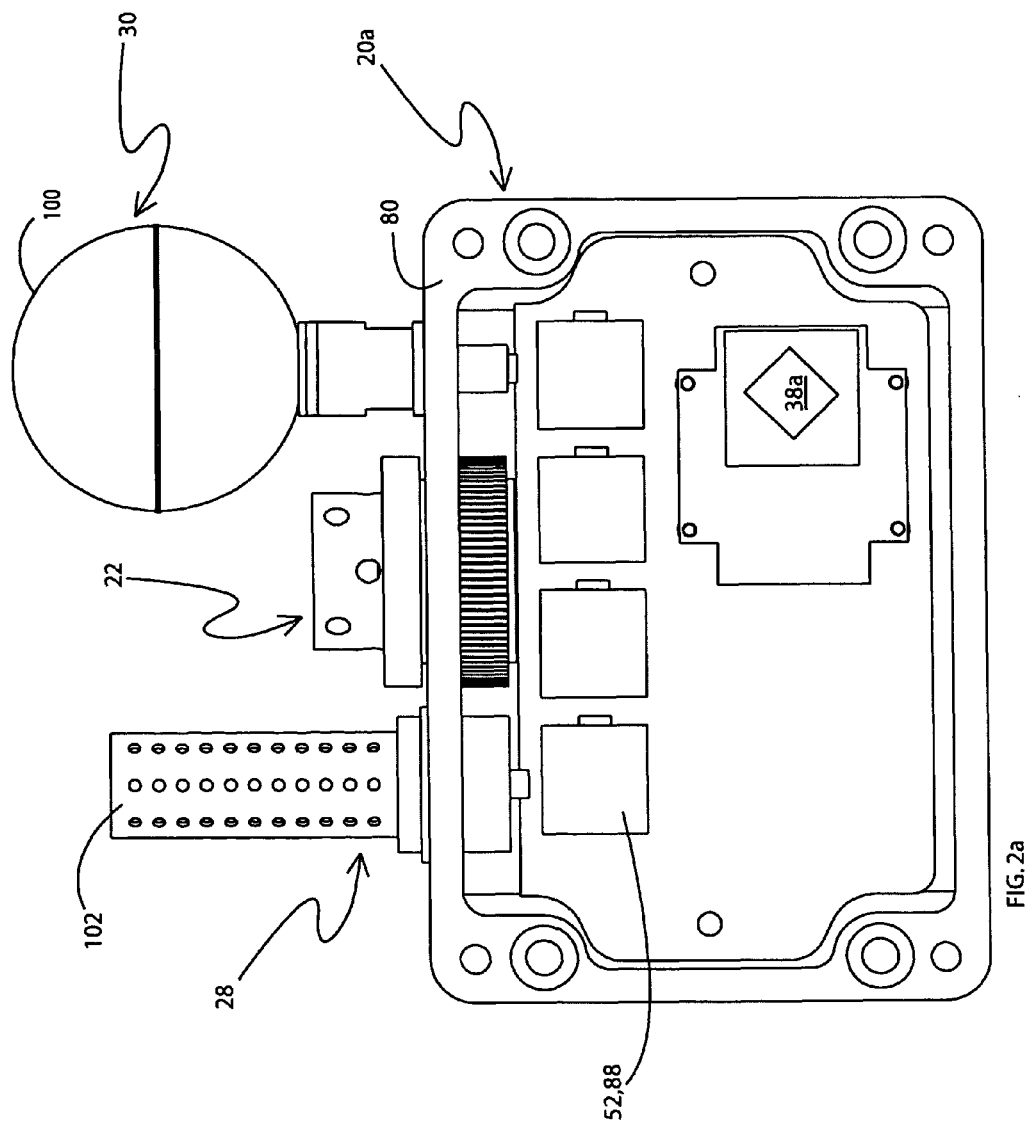
FIG. 2a is a photograph of an energy harvesting heat stress node with the cover and piezo vibration energy harvester removed.
Figure 2B:
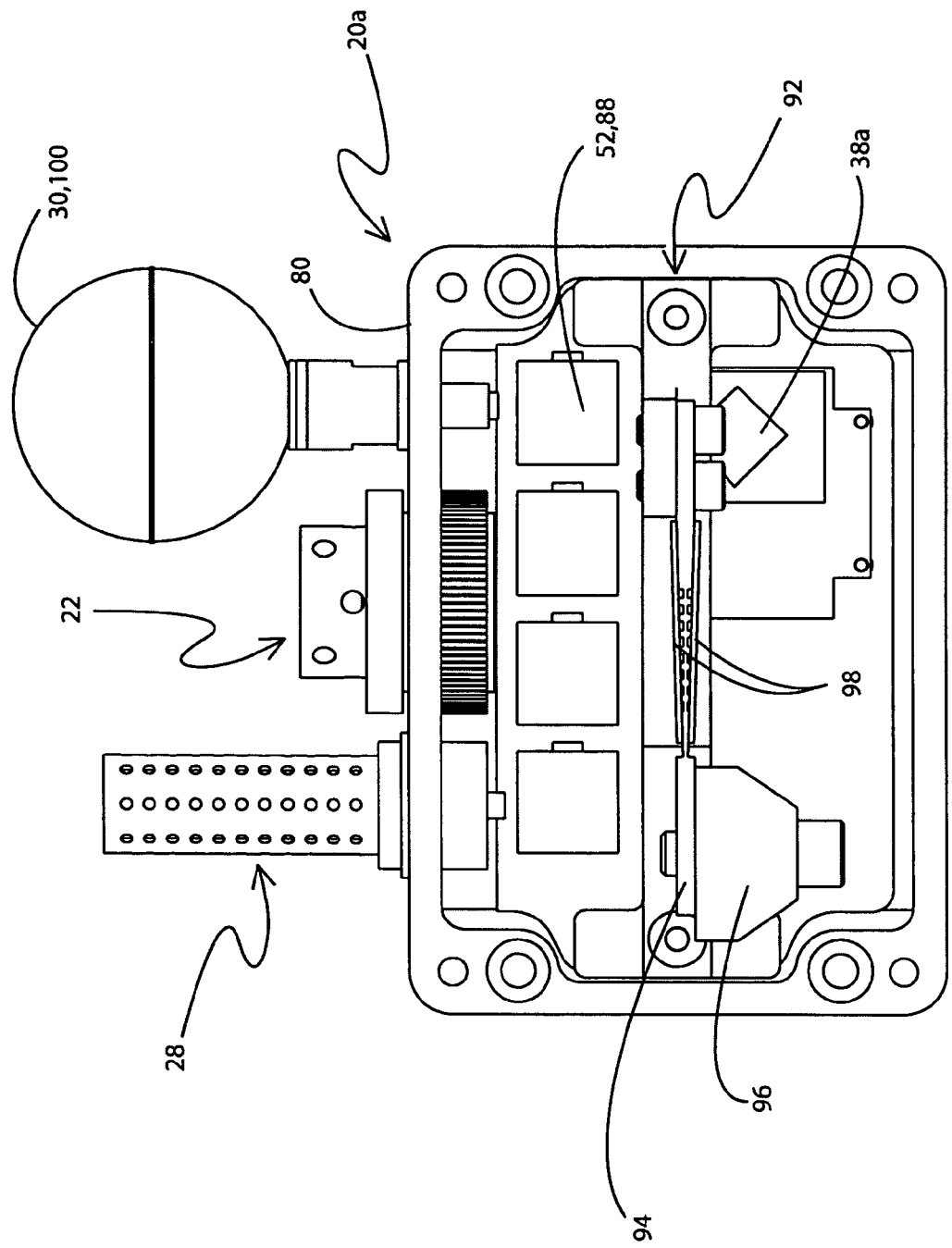
FIG. 2b is a photograph of the energy harvesting heat stress node of FIG. 2a with piezo vibration energy harvester in place.
Figure 2C:
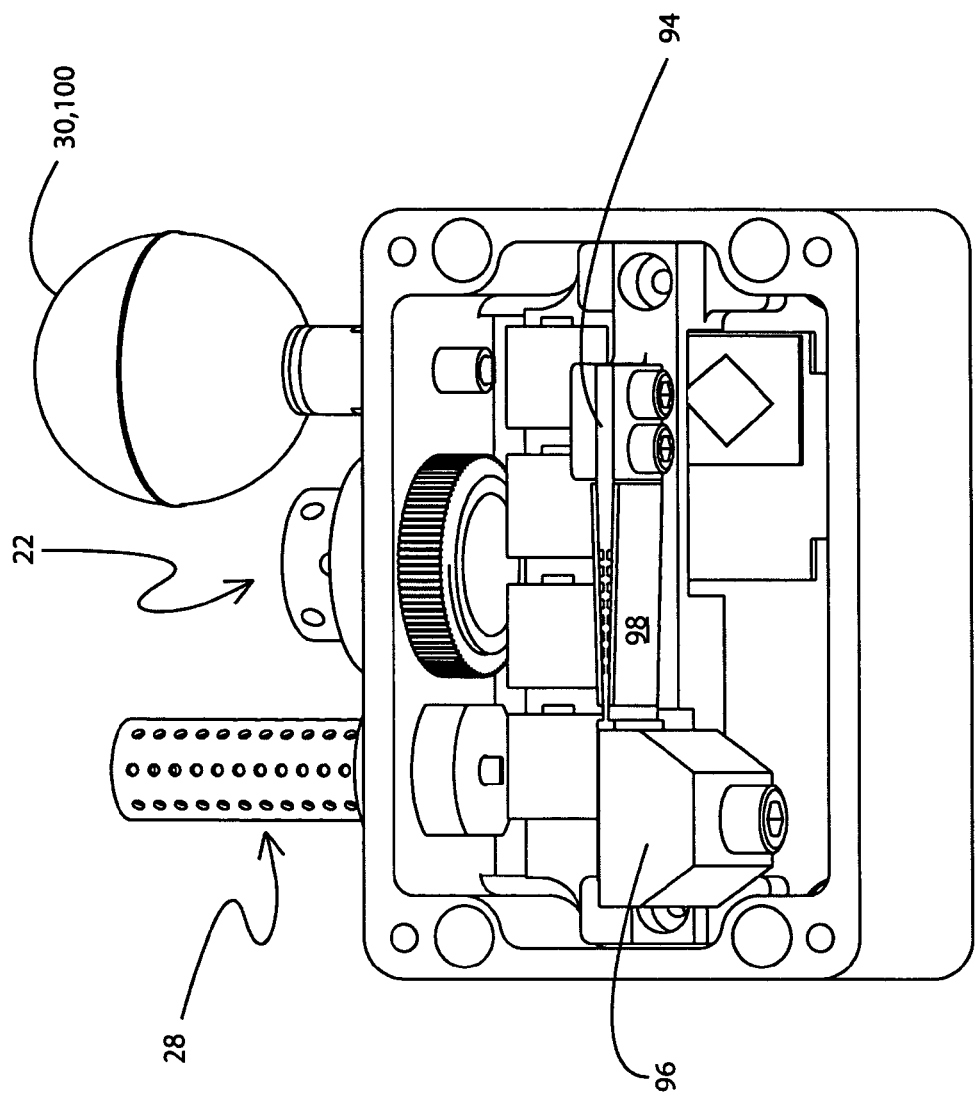
FIG. 2c is a photograph of the energy harvesting heat stress node of FIG. 2b taken from another angle to better make visible the piezo.
Figure 3B:
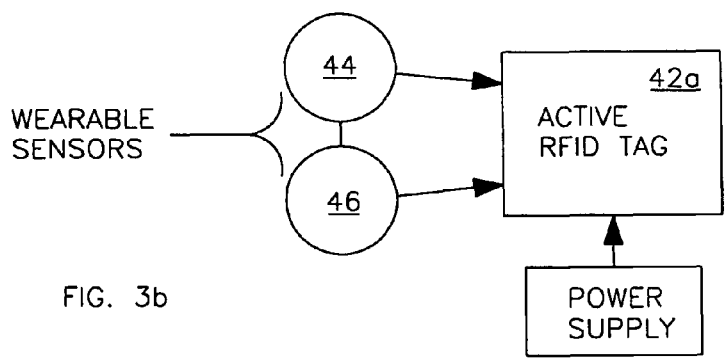
FIG. 3b is a block diagram of an active tag that communicates its ID and sensor data to the heat stress node of FIG. 3a using its own RF transceiver.

Primary batteries may also be deployed, rather than the rechargeable types shown in FIGS. 2a, 2b. Primary batteries have the advantage of providing high energy density. When primary batteries are deployed for the main power source, the energy harvesting circuitry may be eliminated. However, primary batteries require periodic replacement, and they exhibit a shelf life even when not used as an energy source.

In working demonstrations under vibration conditions which closely replicate those of Navy machines, MicroStrain's systems operated indefinitely, solely from the energy harvested from low level machine vibrations. Energy consumption was so low that in those applications where batteries must be deployed and wireless updates were once every second the nodes were using such little energy that they could operate for over 10 years on small primary batteries.

The present applicants found that the fully integrated, software programmable, self calibrating, data logging transceiver modules could support a wide range of sensors, including those used for heat stress nodes 20a. They found that their fully integrated heat stress nodes 20a, 20b could act as a backbone for a scalable wireless sensor network with a wide range of sensors, such as pressure sensors, load cells, resistance temperature detectors, thermocouples, strain gauges, accelerometers, and soil moisture sensors, such as the ECH2O types available from MorpH$_2$O Water Management, Ogden, Utah. Other sensors can also be used.

The present applicants also expect mining operations to benefit from the wireless sensing network as described in this application. In addition to sensing heat stress, and protecting mine workers from heat stress, wireless nodes sensing chemical gases, oxygen levels, and structural integrity could be included along with the heat stress nodes to enhance the system's monitoring capability and to improve mine safety. The radiolocation methods inherent in the system could also be helpful in locating mine workers in the event of an injury or accident within the mine. Miners wearing RFID tags 42a, 42b would have their location periodically tracked over time by the same system monitoring heat stress so in the event of an accident, such as a collapse of a part of the mine, the mine operators can check the last update of the system to determine where the miners were located at the time of the incident so they can better mount a rescue effort directed to that location.

Heat stress nodes 20a, 20b and/or wearable RFID tags 42a, 42b can have an audible alarm or a vibrator to warn the miners or other workers.

Plant Health Monitoring with Smart-Leaf Wireless Sensor Node

Figure 10A:
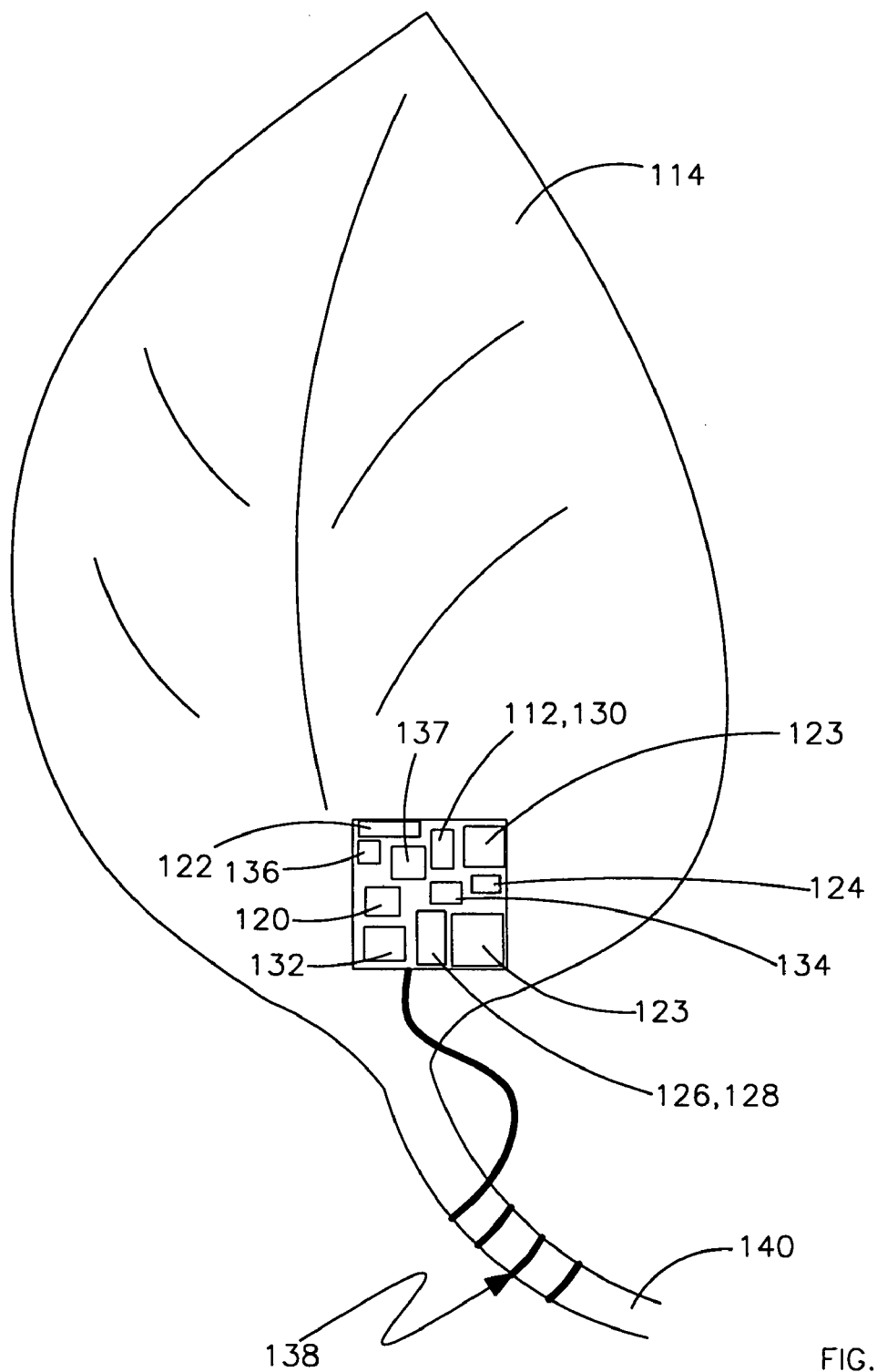
FIG. 10a is a block diagram of a plant stress node mounted on a real leaf.
Figure 10B:
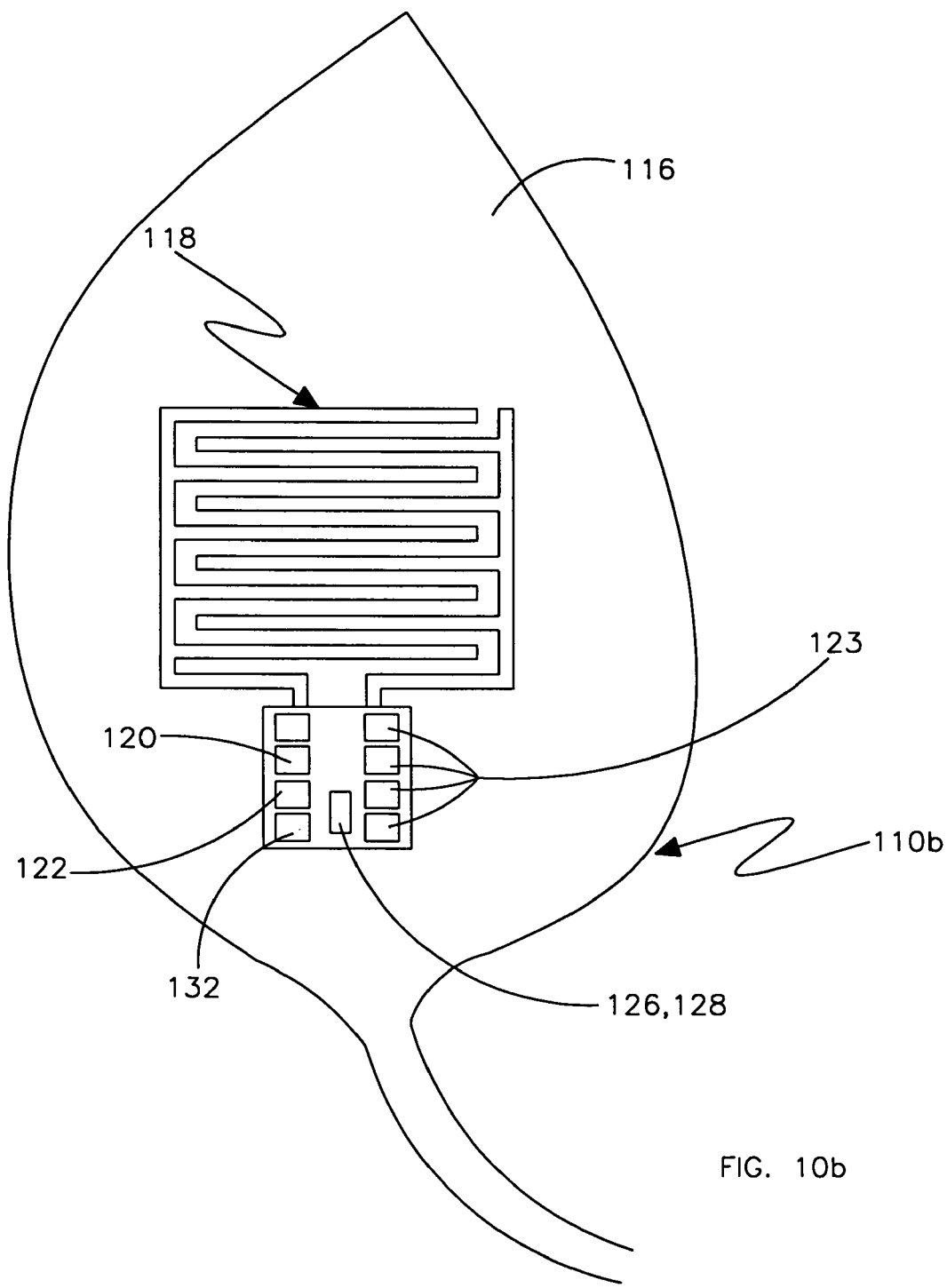
FIG. 10b is a block diagram of a plant stress node mounted on a leaf shaped printed circuit board having a capacitive surface wetness sensor.

One embodiment of a wireless sensor node 110a mounted on small printed circuit board 112 that is mounted to living leaf 114 is shown in FIG. 10a. Another embodiment has leaf-shaped printed circuit board 116 with integrated capacitive surface wetness sensor 118 for measuring surface wetness with a wireless sensor node 110b mounted thereon is shown in FIG. 10b. In this embodiment leaf-shaped printed circuit board 116 with capacitive surface wetness sensor 118 is flexible and approximates the size, shape and weight of the leaf or crop of interest. Wireless sensor node 110a, 110b for either embodiment includes integrated electronics, a source of power, and sensors.

Leaf-borne surface wetness detection sensor 118 includes a capacitive sensing element, such as that formed from interdigitated microelectrodes and described in commonly assigned co-pending U.S. patent application Ser. No. 10/379, 224, incorporated herein by reference.

Integrated electronics includes microcontroller 120 and flash memory 122 for logging data. Microcontroller 120 can include its own non-volatile memory for storing programs. It can also include an RF transceiver. One example of microcontroller 120 that includes both non-volatile memory and an RF transceiver is Chipcon CC2431. Another is Chipcon CC2420 along with Microchip PIC 18F4620.

The source of power includes solar cell 123 and capacitor or thin film rechargeable battery 124 that is sized to provide power for operating microcontroller 120 and one transmission of its RF transceiver after being charged by solar cell 122. Surface mountable stacked solar cells that can be connected to recharge capacitor or rechargeable battery 124 are available from IXYS Corporation, part number XOB 17-04x3.

Sensors include ambient temperature sensor 126, relative humidity sensor 128, solar intensity sensor 130, infrared thermopile or thermocouples 132, accelerometer 134, and piezo film/vibration sensor 136.

Infrared thermopile or thermocouples 132 may be used for measuring adjacent leaf temperature, and are available from Dexter research Center, Inc. part number DXNCT02. These sensors have a lens that has a field of view and the device averages the IR temperature reading over that field of view. It can be aimed at a tree, for example, to measure temperature averaged over the whole tree.

Accelerometer 134 can be used for estimating wind speed, and are available from Analog Devices, part number ADXL202.

Piezo film/vibration sensor 136 can be used for estimating wind speed. Surface mount antenna 137 can also be provided for use with radio and microcontroller 120.

In addition, wire wrap 138 can be used for attaching the printed circuit board to living leaf 114 or to stem 140 of a plant, as shown in FIG. 10a.

Electronics can be protected in epoxy or can be coated with paralyne wax, leaving the solar cells, and sensors exposed. Alternatively, electronics can be mounted and potted on one side of the printed circuit board while solar cells and sensors are mounted and exposed on other side of the board.

Data from sensors 118 and 126-136 is transmitted to a coordinator node or base station (not shown) that logs the data and uses it in an algorithm or look up table to determine a parameter such as crop stress and leaf wetness. Alternatively, a parameter such as crop stress and leaf wetness can be determined in processor 120 and that parameter can be transmitted to the base station.

Non-contact Infrared Thermal Sensor

Non-contact infrared thermometers 132 are a useful tool for measuring the temperature of crop leaves and canopies. The temperature measurements can be used to estimate plant health variables such as leaf wetness, water content, and senescence, as described in a paper by Jackson, R. D. 1986, "Remote sensing of biotic and abiotic plant stress," *Annual Review of Phytopathology*, 24, 265-287, incorporated herein by reference.

Leaf temperature is governed by external variables including solar radiation, water absorption rate, water evaporation rate, etc., and therefore inference of plant health from leaf temperature requires additional environmental data such as solar intensity, wind speed, ambient temperature, and relative humidity. The nodes described in FIGS. 10a, 10b are capable of measuring many if not all of these parameters, allowing meaningful plant health estimates to be performed on the node itself.

Sensing Changes in Foliage-Dependent RF Path Loss

Water is a strong attenuator of RF signals in the 2.4 GHz band. The water contained within vegetation is no exception, and several studies have demonstrated foliage-dependent RF attenuation. For example, deciduous forests exhibit higher path loss in the summer as opposed to winter due to the presence of leaves, as described in the paper by Michler, O., "Outdoor Radiolinks for 2.4 GHz frequencies: measurement results and experiences within the radio communication network," *Advances in Radio Science*, 1:1, 301-307 2003, and wet leaves cause higher path loss than dry leaves, as described in the paper by Pelet, E R, Salt, E J and Wells, G.," *Canadian Conference on Electrical and Computer Engineering*, Vol 3., 2004. This foliage-dependent fading can be measured by a network of wireless sensor nodes, with each radio communication link serving as a sensor in itself.

Wireless sensor node 110a, 110b can be equipped with a bi-directional transceiver capable of measuring the signal strength of the received signal. This feature is commonly referred to as received signal strength indicator, or RSSI. Assuming that each node is programmed to transmit at a constant power level, RSSI can be used to measure relative changes in path loss. Leaf wetness and foliage state are not the only environmental variables that contribute to path loss, however. Small changes in antenna position and orientation can also effect the amplitude of the received signal, as can interference from other wireless transmitters in the same frequency band. These sources are examples of fast-fading, contributing small changes in RSSI over a relatively short time scale. In contrast, leaf-wetness contributes to fading over a longer time scale, i.e. slow fading. An appropriate averaging filter can be selected to isolate the slow fading effect. Thus, the technique can be used to distinguish leaf wetness and foliage state.

Wireless Energy Harvesting Plant Stress & Health Node Operating Specifications:

Wireless transceiver: IEEE 802.15.4 spread spectrum transceiver (2.4 GHz)

Wireless range: 70 meters, line of sight (LOS)

Data logging: 2 Mbytes flash EEPROM

Sensing: Dry Bulb, Black Body, and relative humidity (RH), direct leaf wetness (capacitive), indirect leaf wetness (such as infrared non-contacting thermopile), soil moisture, RF signal strength, solar intensity, wind speed (cup or ultrasonic type)

Processing: Embedded Wet Bulb & Heat Stress calculations

Vibration and/or Strain Energy Harvester: Fully integrated, externally tunable over +/−10 Hz range Solar Energy Harvester: Solar power cell(s), flat panel(s), variable orientation Battery: Background rechargeable from machine vibration (electrochemical or other non-flammable type)

Update rate: Once every 60 seconds with +/−150 milliG's vibration levels

Once every 30 minutes (no vibration present)

Operating voltage: +3 VDC

Power consumption: ~33 microamperes (100 microwatts), average

Environmental: Capable of MIL-STD 810 vibration and temperature ranges

Electromagnetic: Shielded enclosure, MIL-STD 461 EMI compliant

Enclosure Size: 4.3"×3.0"×2.2", aluminum box w/ gasket compression seal

Accuracy: <2 deg C. for dry bulb, black body, and calculated wet bulb globe temperature (WGBT)

Linking to Geographic Information

Data collected by the wireless sensing network, including temperatures, discrete IR sensor data, IR image data, humidity, heat stress, soil moisture, RF communications signal strength, RF link quality, and direct measures of leaf wetness may be displayed over a map, such as provided by the Google Maps API.

FIG. 11a provides an example of two different temperature sensors providing data as a function of time overlaid on a Google Earth map image showing the location of the sensor node in northern Vermont, more specifically, as shown in FIG. 11b for the "zoomed in" locale of 310 Hurricane Lane in Williston, Vt., USA. FIG. 11c provides even more zooming in and includes a drawing of a plant stress monitoring network situated behind office buildings on 310 Hurricane Lane (Williston, Vt.). The network may include a wireless enthernet LAN or a cell phone connection or a satellite data uplink connected to the coordinator node. As shown in FIG. 11a, the end user may select a particular node on the map interface and may also select a view of real time data or historical data. In this case, the historical data set is a chart of temperatures taken by two sensors in the sensor node as temperature varied over time.

In addition to air temperature, other sensors can be used to measure parameters, such as humidity, emitted infrared radiation, light intensity, acceleration, vibration, and seismic data. The sensors may be included in sensor monitoring nodes similar to the heat stress nodes described herein above.

In addition to static Google earth images, the data from wireless sensing nodes can be combined with any other map, including real time satellite images from periodically updated dynamic sources such as maps from NASA, GOES, and NOAA satellite images.

An example of a map to which wireless sensing node data can be added is the infrared, visible, and water vapor map that is available to the public on the National Weather Service's web site: http://www.weather.gov/sat_tab.php?image=ir These data may be combined in a complex systems model, such as a neural network, to provide an estimate of the severity of plant stress in various locales, and allow "stress regime" recognition. Stress regime identification would be useful to provide alerts for the potential of forest fires, danger of animal/human stress, flooding warnings, and to support proactive farming such as irrigating or harvesting crops prior to damage.

Encryption

The present applicants demonstrated encrypted and authenticated wireless communications between a heat stress node and a base station using the IEEE 802.15.4 specified security suite which includes AES 128 bit CTR mode encryption and CBC-MAC authentication. The security method can be used on any of the wireless devices described in this application, including the low power nodes using either battery power or energy harvesting.

Self Healing

The present applicants demonstrated wireless, networked heat stress nodes that use the IEEE 802.15.4 and Zigbee standards. This demonstration supported scalable, wireless networks which were self-healing. Self-healing means the network is robust: in the event of damage to any portion of the network other portions will continue to work.

If desired, the networks can also be ad hoc and self forming. Ad hoc and self forming simplifies installation, because new nodes are automatically recognized without user input. A secure, embedded software switch that allows a user to enable/disable Zigbee ad-hoc networking capability using an encrypted pass code can be provided. This is important for security concerns, since an unwelcome node could be used to "spoof" an ad-hoc network that is open to automatic recognition and joining of new nodes. In the case where heightened security is desired, the ad-hoc capability would be disabled.

Environmental Protection

These nodes were packaged to work even when exposed to extreme operating and storage temperatures, vibration, shock, humidity, and water ingress. The present inventors performed environmental test chamber cycling showing that the packages survived and provided heat stress data under stress conditions.

These and other environmental hardening capabilities can be achieved through the use of aluminum, shielded, gasketed enclosures, which comply with IP67 environmental sealing standards of the electronics industry. The present inventors used aluminum IP67 rated enclosures in the developmental systems.

Application for Condition Based Maintenance

Another embodiment of the present patent application provides truly smart structures and machines that have sensors that can autonomously report their maintenance conditions throughout their operating life without requiring power from distributed (plugged-in) sources or battery maintenance.

As users transition to a full Condition Based Maintenance (CBM) they will achieve more accurate and cost effective maintenance program with a reduction in unnecessary repairs and a reduction in preventive maintenance while providing maintenance when needed before damage occurs. The present patent application helps realize these potential benefits by providing information acquisition, analysis, storage, and reporting and by providing integrated, hierarchical, wireless networking.

One embodiment provides a micro-power sensing system that can record and report data over secure wireless networks and that provides sufficient power management that battery maintenance can be eliminated and energy harvesting can to be used to recharge the batteries. The systems can also be environmentally robust and highly secure. The present applicants found that deployment of these wireless sensor networks will reduce sensor installation costs, reduce machinery operational & maintenance costs, enhance machine reliability, and increased personnel safety.

While the disclosed methods and systems have been shown and described in connection with illustrated embodiments, various changes may be made therein without departing from the spirit and scope of the invention as defined in the appended claims.

The invention claimed is:

1. An electronic system, comprising a network including a first sensing device having a first address and a second sensing device having a second address, wherein said first sensing device includes first sensors, a first processor, a first memory, and a first communications device, wherein said first sensors include a first dry bulb temperature sensor, a first relative humidity sensor, and a first radiant energy sensor, wherein said second sensing device includes a second sensor, a second processor, a second memory, and a second communications device, wherein said second memory and said second communications device are connected to said second processor, wherein said second memory includes a program to use said second communications device to communicate said second address and data derived from said second sensor to said first communications device.

2. An electronic system as recited in claim 1, wherein said first processor is connected to receive data from said first dry bulb temperature sensor, said first relative humidity sensor, and said first radiant energy sensor and wherein said first processor is connected to receive an algorithm stored in said first memory.

3. An electronic system as recited in claim 2, wherein said algorithm is for determining a parameter related to heat stress level.

4. An electronic system as recited in claim 2, wherein said algorithm is for determining wet bulb temperature.

5. An electronic system as recited in claim 2, wherein said algorithm is for determining wet bulb globe temperature.

6. An electronic system as recited in claim 2, wherein said algorithm is for determining stay time.

7. An electronic system as recited in claim 6, wherein said first memory includes a stay time table.

8. An electronic system as recited in claim 7, wherein said algorithm is for determining wet bulb globe temperature, and wherein said first memory further includes an algorithm for calculating a stay time from said wet bulb globe temperature and from said stay time table.

9. An electronic system as recited in claim 8, further comprising a real time clock.

10. An electronic system as recited in claim 9, wherein said first processor is connected to said real time clock to determine an exposure time, wherein said first memory further includes an algorithm for determining a difference between said exposure time and said stay time to provide a remaining time.

11. An electronic system as recited in claim 1, wherein said second sensing device includes an RFID tag, wherein said RFID tag includes said second processor, said second memory, and said second communications device, wherein said RFID tag is mountable to a subject, wherein said first processor includes a first transceiver for receiving data from said RFID tag.

12. An electronic system as recited in claim 11, further comprising a real time clock, wherein said first processor uses data received from said RFID tag and time stamped by said real time clock to determine exposure time and to calculate stay time.

13. An electronic system as recited in claim 12, wherein said first memory further comprises an algorithm for determining a difference between said exposure time and said stay time to provide a remaining time.

14. An electronic system as recited in claim 1, wherein said first sensing device further comprises a first housing, wherein said processor and said memory are included in said first housing and wherein said dry bulb temperature sensor, said relative humidity sensor, and said first radiant energy sensor are mounted on said first housing.

15. An electronic system as recited in claim 1, wherein said first communications device includes a wireless communications device.

16. An electronic system as recited in claim 15, wherein said wireless communications device includes at least one from the group consisting of an RF transceiver and an RFID reader.

17. An electronic system as recited in claim 1, wherein said first communications device includes a display.

18. An electronic system as recited in claim 1, further comprising a source of electrical power for operating said first processor, said first memory, and said first communications device.

19. An electronic system as recited in claim 18, wherein said source of electrical power includes at least one from the group consisting of a wall outlet connection, a battery, and a capacitor.

20. An electronic system as recited in claim 18, wherein said source of electrical power includes an energy harvesting device.

21. An electronic system as recited in claim 20, wherein said energy harvesting device includes at least one from the group consisting of a photovoltaic cell, a strain energy harvester, and a vibration energy harvester.

22. An electronic system as recited in claim 1, wherein said first sensing device comprises a heat stress node, wherein said network includes a plurality of said heat stress nodes.

23. An electronic system as recited in claim 1, wherein said first sensors include a pressure sensor.

24. An electronic system as recited in claim 1, wherein said first sensors include a wind speed sensor.

25. An electronic system as recited in claim 1, wherein said first memory includes a non-volatile memory.

26. An electronic system as recited in claim 25, wherein said first memory is connected for logging data derived from said first sensors.

27. An electronic system as recited in claim 1, further comprising a coordinator connected to said network, wherein said network includes a wireless network and a wired network, wherein said coordinator aggregates data from a plurality of first sensing devices and wherein said coordinator connects said wireless network and said wired network.

28. An electronic system as recited in claim 1, wherein said network includes at least one from the group consisting of a cell phone, a ethernet network connection, a USB connection, and a wireless network.

29. An electronic system as recited in claim 28, wherein said wireless network includes encryption.

30. An electronic system as recited in claim 1, wherein said second sensor comprises a soil moisture sensor.

31. An electronic system as recited in claim 30, wherein said network includes a plurality of said soil moisture sensors.

32. An electronic system as recited in claim 1, wherein said second sensor comprises a leaf wetness sensor.

33. An electronic system as recited in claim 1, further comprising a neural network to classify plant stress.

34. An electronic system as recited in claim 1, wherein said network includes a plurality of said first sensing devices and a plurality of said second sensing devices, further comprising a location tracking device, wherein said location tracking device is connected for determining which second sensing device is near which first sensing device.

35. An electronic system as recited in claim 1, wherein said first processor includes a program for calculating cumulative heat stress from data provided by said second sensing device at multiple locations of said second sensing device.

36. An electronic system as recited in claim 1, further comprising an electronic picture and an overlay on said electronic picture, wherein said overlay includes said first sensing device and said second sensing device.

37. An electronic system as recited in claim 36, wherein said electronic picture includes a picture of a geographic area, wherein said overlay provides said first sensing device and said second sensing device in their locations on said geographic area.

38. An electronic system as recited in claim 36, wherein said overlay provides a first icon for said first sensing device and a second icon for second sensing device, wherein said first icon is different from said second icon if said first sensing device is of a type different from said second sensing device.

39. An electronic system as recited in claim 37, wherein said electronic picture of a geographic area includes a picture available on the internet.

40. An electronic system as recited in claim 37, wherein said electronic picture of a geographic area includes a satellite generated picture.

41. An electronic system as recited in claim 37, wherein said electronic picture of a geographic area includes a Google map.

42. An electronic system, comprising a first sensing device and an RFID tag, wherein said RFID tag is separate from said first sensing device, wherein said first sensing device includes first sensors, a first processor, a first memory, and a first communications device, wherein said first sensors include a first dry bulb temperature sensor, a first relative humidity sensor, and a first radiant energy sensor, wherein said RFID tag includes a processor programmed to communicate its address to said first communications device.

43. An electronic system, as recited in claim 42, wherein said RFID tag comprises a passive communication device.

44. An electronic system, as recited in claim 42, wherein said first communications device comprises a passive RFID reader.

45. An electronic system, as recited in claim 42, wherein said first communications device comprises a first transceiver and wherein said RFID tag comprises a second transceiver.

46. An electronic system, comprising a first sensing device, wherein said first sensing device includes a first energy harvesting device, first sensors, a first processor, a first memory, and a first communications device, wherein said first sensors include a first dry bulb temperature sensor, a first relative humidity sensor, and a first radiant energy sensor, wherein said first energy harvesting device includes a circuit for converting an ambient source of energy into electricity, wherein said first energy harvesting device includes at least one from the group consisting of a strain energy harvester and a vibration energy harvester, wherein all power for operating said first communications device is derived from said first energy harvesting device.

47. An electronic system, comprising a network including a plurality of sensing devices, wherein said plurality of sensing devices includes a first sensing device including first sensors, a first processor, a first memory, and a first wireless communications device, wherein said first sensors include a first dry bulb temperature sensor, a first relative humidity sensor, a first radiant energy sensor, and a source of electrical power, wherein said plurality of sensing devices are connected in a hybrid star-mesh network, wherein mesh networked ones of said sensing devices are enabled to forward data from another sensing device and wherein star networked ones of said sensing devices are not enabled to forward data from another sensing device.

48. An electronic system as recited in claim 47, wherein said source of electrical power includes at least one from the group consisting of an energy harvesting device, a battery, a capacitor, and a wall outlet connection.

49. An electronic system as recited in claim 47, wherein said first processor is capable of sleep mode, and wherein said first processor includes a program to enter said sleep mode after processing a sample of data from said first sensors.

50. An electronic system as recited in claim 47, wherein each of said plurality of sensing devices includes a processor and a sensor, wherein said processor is capable of sleep mode, wherein said processor includes a program to enter said sleep mode after processing a sample of data from said sensor.

* * * * *